United States Patent [19]

Cassarino, Jr. et al.

[11] 3,997,896
[45] Dec. 14, 1976

[54] DATA PROCESSING SYSTEM PROVIDING SPLIT BUS CYCLE OPERATION

[75] Inventors: Frank V. Cassarino, Jr., Weston; George J. Bekampis, Sudbury; John W. Conway, Waltham; Richard A. Lemay, Bolton, all of Mass.

[73] Assignee: Honeywell Information Systems, Inc., Waltham, Mass.

[22] Filed: June 30, 1975

[21] Appl. No.: 591,965

[52] U.S. Cl. .......................................... 340/172.5
[51] Int. Cl.² ...................................... G06F 13/00
[58] Field of Search ............ 340/172.5; 179/15 AL

[56] References Cited
UNITED STATES PATENTS

| | | | |
|---|---|---|---|
| 3,478,321 | 11/1969 | Cooper et al. | 340/172.5 |
| 3,710,324 | 1/1973 | Cohen et al. | 340/172.5 |
| 3,866,181 | 2/1975 | Gayman et al. | 340/172.5 |
| 3,886,524 | 5/1975 | Appelt | 340/172.5 |

Primary Examiner—Gareth D. Shaw
Assistant Examiner—Melvin B. Chapnick
Attorney, Agent, or Firm—John S. Solakian

[57] ABSTRACT

In a data processing system which includes a common bus to which a plurality of units are connected for the transfer of information, information may be transferred by the highest priority requesting unit during an asynchronously generated bus transfer cycle. Logic is provided for enabling a split bus cycle operation in which the master unit requesting information from the slave unit during a first bus transfer cycle may receive such information from the slave unit during a later slave generated bus transfer cycle. Means are provided for enabling any other units to communicate over the common bus during the time between the first cycle and such later cycle during which the slave unit responds, thereby enabling at least two pairs of units to communicate with each other respectively in an interleaved manner.

16 Claims, 13 Drawing Figures

DATA PROCESSING SYSTEM PROVIDING SPLIT BUS CYCLE OPERATION

BACKGROUND OF THE INVENTION

The apparatus of the present invention generally relates to data processing systems and more particularly to data processing operations provided over a common input/output bus.

In a system having a plurality of devices coupled over a common bus an orderly system must be provided by which bidirectional transfer of information may be provided between such devices. This problem becomes more complicated when such devices include for example one or more data processors, one or more memory units, and various types of peripheral devices, such as magnetic tape storage devices, disk storage devices, card reading equipment and the like.

Various methods and apparatus are known in the prior art for interconnecting such a system. Such prior art systems range from those having common data bus paths to those which have special paths between various devices. Such systems also may include a capability for either synchronous or asynchronous operation in combination with the bus type. Some of such systems, independent of the manner in which such devices are connected or operate, require the data processor's control of any such data transfer on the bus even though for example the transfer may be between devices other than the data processor. In addition such systems normally include various parity checking apparatus, priority schemes and interrupt structures. One such structural scheme is shown in U.S. Pat. No. 3,866,181. Another is shown in U.S. Pat. No. 3,676,860. A data processing system utilizing a common bus is shown in U.S. Pat. No. 3,815,099. The manner in which addressing is provided in such systems as well as the manner in which for example any one of the devices may control the data transfer is dependent upon the implementation of the system, i.e., whether there is a common bus, whether the operation thereof is synchronous or asynchronous, etc. The system's response and throughput capability is greatly dependent on these various structures.

It is accordingly a primary object of the present invention to provide an improved data processing system having a plurality of devices, including the data processor, connected to a common bus.

SUMMARY OF THE INVENTION

The above and other objects of the invention are obtained by providing a data processing system comprising a plurality of units coupled to transfer information over a common electrical bus between any two of the units during synchronously generated information transfer cycles. A first one of the units includes apparatus for enabling the transfer of first information to a second one of the units during a first transfer cycle. The first such information indicates that a request for the further transfer of information from the second unit to the first unit has been made. Apparatus is included in the second unit which, in response to the first information, enables the transfer of second information to the first unit during a later transfer cycle asynchronously generated at a point in time following the first cycle. Further apparatus is provided in each of the units for enabling the transfer of information between any two units except the first and second units during any transfer cycle generated between the time the first cycle and the later cycle are generated.

BRIEF DESCRIPTION OF THE DRAWINGS

The manner in which the apparatus of the present invention is constructed and its mode of operation can best be understood in the light of the following detailed description, together with the accompanying drawings, in which.

DETAILED DESCRIPTION OF THE PREFERRED EMBODIMENT

Figure 1:
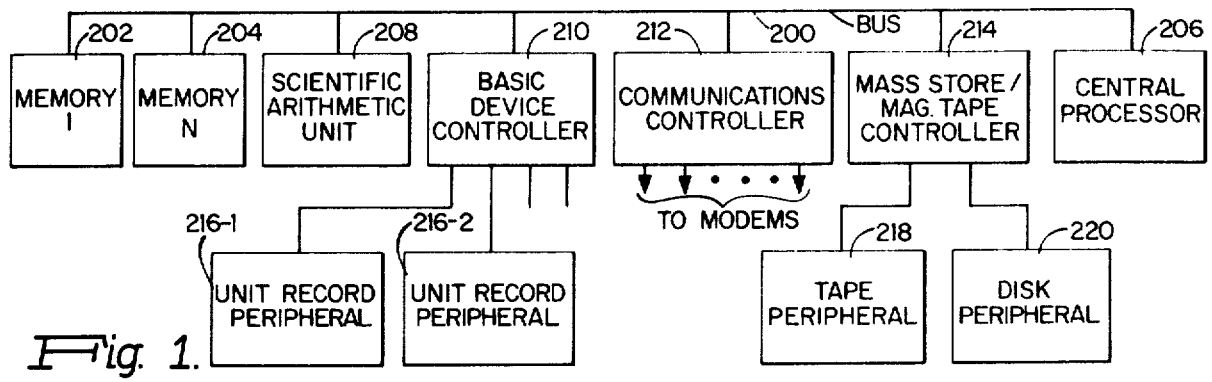
FIG. 1 is a general block diagram illustration of the present invention.

The data processing bus of the present invention provides a communication path between two units in the system. The bus is asynchronous in design enabling units of various speeds connected to the bus to operate efficiently in the same system. The design of the bus of the present invention permits communications including memory transfers, interrupts, data, status, and command transfers. The overall configuration of a typical system is shown in FIG. 1.

The bus permits any two units to communicate with each other at a given time via a common (shared) signal path. Any unit wishing to communicate, requests a bus cycle. When that bus cycle is granted, that unit becomes the master and may address any other unit in the system as the slave. Most transfers are in the direction of master to slave. Some types of bus interchange require a response cycle (read memory for example). In cases where a response cycle is required, the requestor assumes the role of the master, indicates that a response is required, and identifies itself to the slave. When the required information becomes available, (depending on slave response time), the slave now assumes the role of the master, and initiates a transfer to the requesting unit. This completes the interchange which has taken two bus cycles in this case. Intervening time on the bus between these two cycles may be used for other system traffic not involving these two units.

Figure 2:
FIGS. 2 through 6 illustrate the format of various information transferred over the common bus of the present invention.
Figure 3:

A master may address any other unit on the bus as a slave. It does this by placing the slave address on the address leads. There may be 24 address leads for example which can have either of two interpretations depending on the state of an accompanying control lead, called the memory reference signal (BSMREF-). If the memory reference signal is a binary ZERO, the format of FIG. 2 applies to the address leads with the 23rd such lead being the least significant bit. It should be noted that as used in this specification, the terms binary ZERO and binary ONE are used respectively to refer to the low and high states of electrical signals. If the memory reference signal is a binary ONE, the format for such 24 bits as shown in FIG. 3 applies. In essence, when the memory is being addressed, the bus enables up to $2^{24}$ bytes to be directly addressed in memory. When units are passing control information, data or interrupts, they address each other by channel number. The channel number allows up to $2^{10}$ channels to be addressed by the bus. Along with the channel number, a six bit function code is passed which specifies which of up to $2^6$ possible functions this transfer implies.

When a master requires a response cycle from the slave, it indicates this to the slave by one state (read command) of a control lead named BSWRITE- (the other state thereof not requiring a response, i.e. a write command). In addition, the master may provide its own identity to the slave by means of a channel number. The data leads, as opposed to the bus address leads, are coded in accordance with the format of FIG. 4 to indicate the master's identity when a response is required from the slave. The response cycle is directed to the requestor by a non-memory reference transfer. The control lead, indicated as a second-half bus cycle (BSSHBC-), is enabled to designate that this is the awaited cycle (as compared to an unsolicited transfer from another unit).

Figure 8:
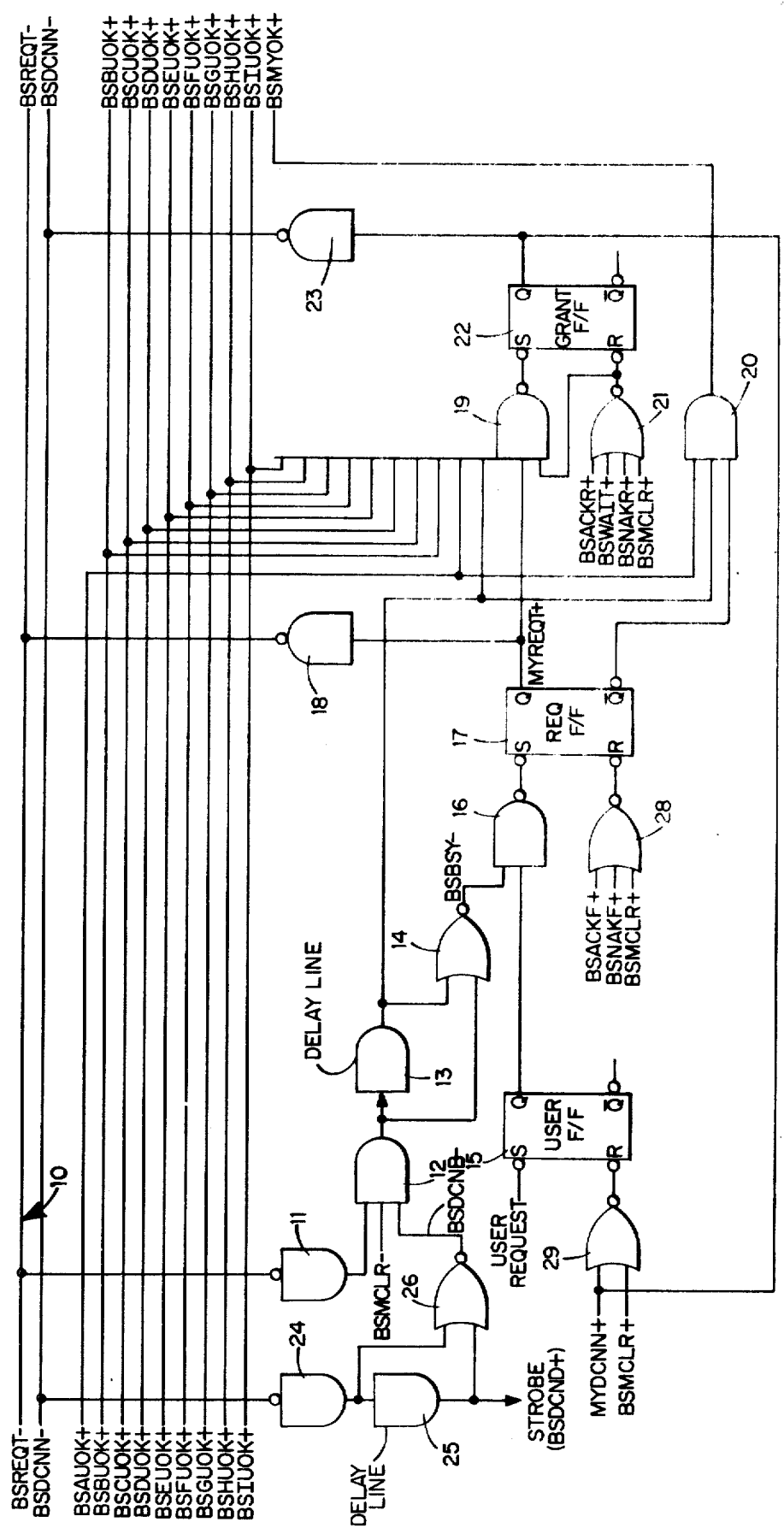
FIG. 8 illustrates a logic diagram of the priority network of the present invention.

The distributed tie-breaking network provides the function of granting bus cycles and resolving simultaneous requests for use of the bus. Priority is granted on the basis of physical position on the bus, the highest priority being given to the first unit on the bus. The logic to accomplish the tie-breaking function is shown in FIG. 8 and is distributed identically among all units connected to the bus. In a typical system, the memory is granted the highest priority and the central processor is granted the lowest priority with the other units being positioned on the basis of their performance requirements.

Thus, referring to FIG. 1, a typical system of the present invention includes a multiline bus 200 coupled with memory 1-202 through memory N-204, such memories having the highest priority and with the central processor 206 having the lowest priority. Also connected on the bus may be included for example a scientific arithmetic unit 208 and various controllers 210, 212 and 214. Controller 210 may be coupled to control for example four unit record peripheral devices 216. Controller 212 may be used to provide communications control via modem devices whereas controller 214 may be utilized to control mass storage devices such as a tape peripheral device 218 or a disk peripheral device 220. As previously discussed, any one of the devices coupled with the bus 200 may address a memory or any other unit connected to the bus. Thus tape peripheral 218 may, via controller 214, address memory 202. As shall be hereinafter discussed, each of such units directly connected to the bus includes a tie-breaking logic as illustrated and discussed with respect to FIG. 8, and further each one of such units includes address logic as discussed with reference to FIG. 9 for a typical basic device controller address logic, FIG. 10 for typical memory address logic, and FIG. 11 for typical central processor address logic. Units not directly connected to the bus, such as units 216, 218 and 220 also have tie-breaking logic.

A channel number will exist for every end point in a particular system with the exception of the memory type processing elements which are identified by the memory address. A channel number is assigned for each such device. Full duplex devices as well as half-duplex devices utilize two channel numbers. Output only or input only devices use only one channel number each. Channel numbers are easily variable and accordingly one or more hexadecimal rotary switches (thumb wheel switch) may be utilized for each such unit connected with the bus to indicate or set the unit's address. Thus when a system is configured, the channel number may be designated for the particular unit connected to the bus as may be appropriate for that particular system. Units with multiple input/output (F/O) ports generally will require a block of consecutive channel numbers. By way of example, a four port unit may use rotary switches to assign the upper 7 bits of a channel number and may use the lower order 3 bits thereof to define the port number to distinguish input ports from output ports. The channel number of the slave unit will appear on the address bus for all non-memory transfers as shown in FIG. 3. Each unit compares that number with its own internally stored number (internally stored by means of the rotary switches). The unit which achieves a compare is, by definition, the slave, and must respond to that cycle. Generally, no two points in a single system will be assigned to the same channel number. As shown in FIG. 3, a specific bus or I/0 function can be performed as indicated by bits 18 through 23 of the bus address leads for non-memory transfers. Function codes may designate output or input operations. All odd function code designate output transfers (write) while all even function codes designate input transfer requests (read). The central processor examines the least significant bit 23 of the 6 bit function code field for an input/output command and uses a bus lead to designate the direction.

Figure 5:
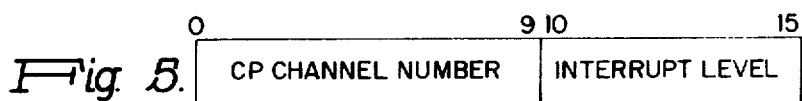

There are various output and input functions. One of the output functions is a command whereby a data quantity, for example 16 bits is loaded into the channel from the bus. The meanings of the individual data bits are component specific, but the data quantity is taken to mean the data to be stored, sent, transmitted, etc. depending upon the specific component functionally. Another such output function is a command whereby for example a 24 bit quantity is loaded into a channel address register (not shown). The address is a memory byte address and refers to the starting location in memory where the channel will commence input or output of data. Various other output functions include an output range command which defines the size of the memory buffer assigned to the channel for a specific transfer, an output control command which by its individual bits causes specific responses, output task functions such as print commands, output configuration which is a command to indicate functions such as terminal speed, card reader mode, etc., and output interrupt control which is a command which loads for example a 16-bit word into the channel with the format as shown in FIG. 5. The first 10 bits indicate the central processor channel number and bits 10 through 15 indicate the interrupt level. Upon interrupt, the central processor channel number is returned on the address bus while the interrupt level is returned on the data bus.

The input functions include functions similar to the output functions except in this case the input data is transferred from the device to the bus. Thus, input functions include the input data, input address and input range commands as well as the task configuration and interrupt commands. In addition, there is included the device identification command whereby the channel places its device identification number on the bus. Also included are two input commands whereby a status word 1 or a status word 2 is placed on the bus from the channel as presently discussed.

The indication from status word 1 may include for example whether or not the specific device is operational, whether it is ready to accept information from the bus, whether there is an error status or whether attention is required. Status word 2 may include for example an indication of parity, whether there is a non-correctable memory or a corrected memory error, whether there is a legal command or for example whether there is a non-existent device or resource.

Figure 6:
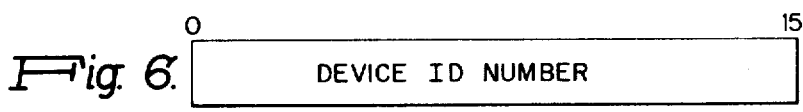

As previously discussed, a unique device identification number is assigned to every different type of device which is connected to the bus. This number is presented on the bus in response to the input function command entitled input device identification. This number is placed on the data bus in the format shown in FIG. 6. For convenience, the number is separated into 13 bits identifying the device (bits 0 through 12) and three bits identifying certain functionality of the device (bits 13 through 15) as may be required.

Figure 7:
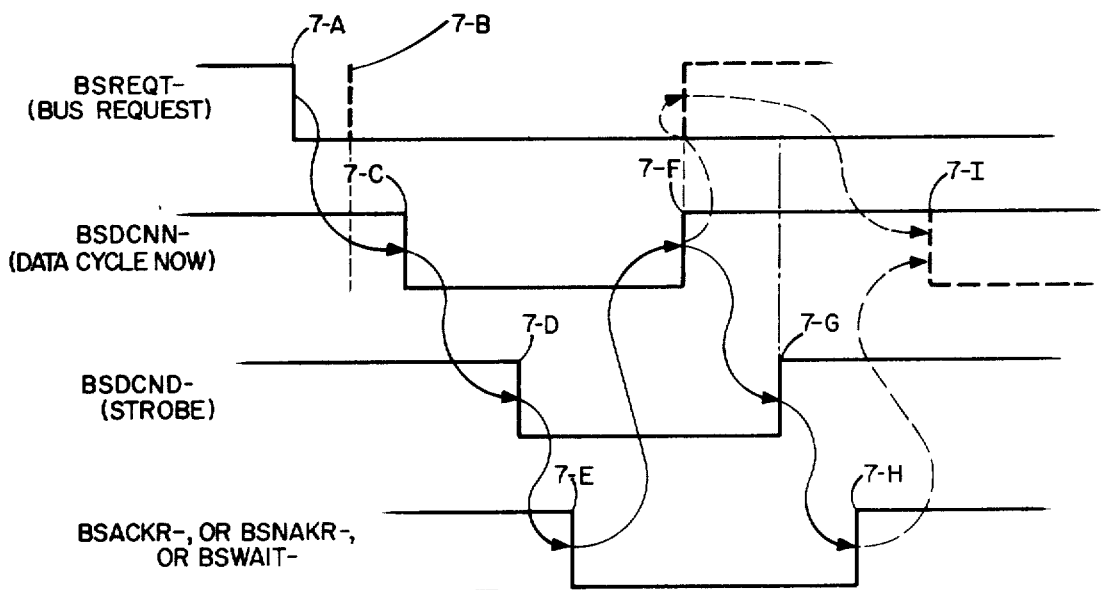
FIG. 7 illustrates a timing diagram of the operation of the bus of the present invention.

A unit wishing to interrupt the central processor requests a bus cycle. When this bus cycle is granted, the unit places its interrupt vector on the bus, the interrupt vector including the channel number of the central processor and the interrupt level number. The unit thus provides, as its interrupt vector, the master's channel number and its interrupt level number. If this is the central processor's channel number, the central processor will accept the interrupt if the level presented is numerically smaller than the current internal central processor level and if the central processor has not just accepted another interrupt. Acceptance is indicated by a bus ACK signal (BSACKR-). If the central processor cannot accept the interrupt, a NAK signal is returned (BSNAKR-). Devices receiving a NAK (sometimes referred to as NACK) signal will retry when a signal indicating resume normal interrupting is received from the CP (BSRINT-). The central processor issues this signal when it has completed a level change and therefore may be capable of accepting interrupts once again. The channel number of the master is supplied in the vector for use since more than one channel may be at the same interrupt level. Interrupt level 0 is of special significance since it is defined to mean that the unit shall not interrupt. FIG. 7 illustrates the bus timing diagram and will be discussed more specifically hereinafter. Generally, however the timing is as follows. The timing applies to all transfers from a master unit to a slave unit connected to the bus. The speed at which the transfer can occur is dependent upon the configuration of the system. That is, the more units connected to the bus and the longer the bus, then, due to propagation delays, the longer it takes to communicate on the bus. On the other hand, the lesser amount of units on the bus decreases the response time. Accordingly, the bus timing is truly asynchronous in nature. A master which wishes a bus cycle makes a bus request. The signal BSREQT- is common to all units on the bus and if a binary ZERO, indicates that at least one unit is requesting a bus cycle. When the bus cycle is granted, the signal BSDCNN- becomes a binary ZERO indicating that a tie-breaking function as more specifically discussed with respect to FIG. 8, is complete and that one specific master now has control of the bus. At the time the signal BSDCNN- becomes a binary ZERO, the master applies the information to be transferred to the bus. Each unit on the bus develops an internal strobe from the signal BSDCNN-. The strobe is delayed for example approximately 60 nanoseconds from the reception of the binary ZERO state of the BSDCNN- signal. When the delay is complete in the slave, the bus propagation time variations will have been accounted for and each slave unit would have been able to recognize its address (memory address or channel number). The addressed slave can now make one of three responses, either an ACK, a NACK or a WAIT signal, or more specifically a BSACKR- , a BSNAKR-, or a BSWAIT- signal. The response is sent out on the bus and serves as a signal to the master that the slave has recognized the requested action. The control lines then return to the binary ONE state in the sequence as shown in FIG. 7. Thus the bus handshake is fully asynchronous and each transition will only occur when the preceding transistion has been received. Individual units may therefore take different lengths of time between the strobe and the ACK, etc., transition depending on their internal functionality. A bus timeout function exists to prevent hang ups which could occur.

Information which is transferred over the bus can include for example 50 signals or bits, which may be broken down as follows: 24 address bits, 16 data bits, 5 control bits, and 5 integrity bits. These various signals will be discussed hereinafter.

The tie-breaking function, more specifically described with respect to FIG. 8, is that of resolving simultaneous requests from different units for service and granting bus cycles on a basis of a positional priority system. As indicated hereinbefore, the memory has the highest priority and the central processor has the lowest priority and they reside physically at opposite ends of the bus 200. Other units occupy intermediate positions and have priority which increases relative to their proximity to the memory end of the bus. The priority logic of FIG. 8 is included in each one of the units directly connected to the bus in order to accomplish the tie-breaking function. Each such unit's priority network includes a grant flip-flop. At any point in time, only one specific grant flip-flop may be set and that unit is by definition the master for that specific bus cycle. Any unit may make a user request at any time thus setting its user flip-flop. At any time therefore, many user flip-flops may be set, each representing a future bus cycle. In addition, each unit on the bus contains a request flip-flop. When all units are considered together, the request flip-flops may be considered as a request register. It is the outputs of this register that supply the tie-breaking network which functions to set only one grant flip-flop no matter how many requests are pending. More specifically, if there was no pending requests, then no request flip-flops would be set. The first user flip-flop to set would cause its request flip-flop to set. This in turn would inhibit, after a short delay as hereinafter described, other devices from setting their request flip-flops. Thus what occurs is that a snap-shot of all user requests is taken for the given period in time (the delay's period). The result is that a number of request flip-flops may be set during this delay period depending upon their arrival. In order to allow the request flip-flops to have their outputs become stable, ach unit includes such delay in order to insure that uch stabilization has occurred. A particular grant flip-lop is set if the unit associated therewith has its request lip-flop set and the delay time has elapsed and no igher priority unit wants the bus cycle. A strobe signal s then generated after another delay period and finally he grant flip-flop is cleared (reset) when the master eceives an ACK, NACK or WAIT signal from the slave nit.

As indicated hereinbefore, there are three possible lave responses, the ACK, the WAIT or the NACK ignal. In addition, there is a fourth state in which there s no response at all. In the case where no unit on the us recognizes the transfer as addressed to it, no response will be forthcoming. A time out function will hen take place and a NACK signal will be received hereby clearing the bus. An ACK signal will be generted if the slave is capable of accepting the bus transfer rom the master and wishes to do so. The WAIT reponse is generated by the slave if the slave is temporary busy and cannot accept a transfer at this time. Upon eceipt of the WAIT signal, the master will retry the ycle at the next bus cycle granted to it and continue to o so until successful. Some of the causes of a WAIT esponse from a slave, when the central processor is the naster, are for example, when the memory is a slave nd the memory is responding to a request from anther unit or when a controller is a slave, for example, f the controller is waiting for a response from memory r if the controller has not yet processed the previous nput/output command. When a controller is the mas-er and the central processor is the slave, the central rocessor may respond with an ACK or a NACK signal o the controller, but not a WAIT signal. In addition, he memory when it is the master cannot be caused to ait whether the slave unit is a central processor or a ontroller. The NACK signal indicated by the slave neans that it cannot accept a transfer at this time. Jpon receipt of a NACK signal, a master unit will not mmediately retry but will take specific action depending upon the type of master.

As generally indicated hereinbefore, there are basic iming signals on the bus which accomplish the hand-haking function thereof. These five signals, as dis-ussed hereinbefore, are bus request signal (BSREQT-) vhich when a binary ZERO indicates that one or more inits on the bus have requested the bus cycle; the data ycle now signal (BSDCNN-) which when a binary ERO indicates a specific master is making a bus trans-er and has placed information on the bus for use by ome specific slave; the ACK signal (BSACKR-) which s a signal generated by the slave to the master that the lave is accepting this transfer by making this signal a inary ZERO; the NAK signal (BSNAKR-) which is a ignal generated by the slave to the master indicating to he master when it is a binary ZERO that it is refusing his transfer; and the WAIT signal (BSWAIT-) which is signal generated by the slave to the master indicating hen it is a binary ZERO that the slave is refusing the ransfer.

In addition and as indicated hereinbefore, there may e as much as fifty information signals which are trans-erred as the information content of each bus cycle. hese signals are valid for use by the slave on the lead-ng edge of the strobe signal. All of the following discussion is by way of example and it should be undertood that the number of bits may be changed for different functions. Thus, there may be 16 leads or bits provided for the data and more particularly signals BSDT00— through BSDT15— There are 24 leads provided for the address, more particularly signals BSAD00— through BSAD23—. There is one bit provided for the memory reference signal (BSMREF—) which when a binary ZERO indicates that the address leads contain a memory address. When the memory reference signal is a binary ONE it indicates that the address leads contain a channel address and a function code as indicated in FIG. 3. There is also provided a byte signal (BSBYTE—) which indicates when it is a binary ZERO that the current transfer is a byte transfer rather than a word transfer, a word typically comprising two bytes. There is also a write signal (BSWRIT—) which indicates when it is a binary ONE that the slave is being requested to supply information to the master. A separate bus transfer will provide this information. There is further provided a second-half bus cycle (BSSHBC—) which is used by the master to indicate to the slave that this is the information previously requested. From the time a pair of units on the bus have started a read operation (indicated by the signal (BSWRIT—) until the second cycle occurs, to complete the transfer (indicated by BSSHBC—) both units may be busy to all other units on the bus.

In addition to miscellaneous error and parity signals, there is also included a lock signal among the fifty information signals on the bus. The lock signal (BSLOCK—) is used to cause a lock operation to occur. This is a multi-cycle bus transfer whereby a unit may read or write a word or multi-word area of memory without any other unit being able to break into the operation with another lock command. This facilitates the connection of the system into a multiprocessing system. The effect of the lock operation is to extend a busy condition beyond the duration of the memory cycle for certain types of operations. Other units attempting to initiate lock signals before the last cycle is complete will receive a NACK response. The memory will however still respond to other memory requests. An example of the lock operation is the read modify write cycle, the three bus cycles of which are as follows. During the first bus cycle, the address bus contains the memory address, the data bus contains the channel number of the originator, the signal BSWRIT— is a binary ZERO indicating a response is required, the signal BSLOCK— is a binary ZERO indicating that this is a locked operation and further the BSMREF— signal is a binary ZERO, and the signal BSSHBC— is a binary ONE. During the second bus cycle of the read modify write operation, the address bus contains the channel number of the originator, the data bus contains the memory data, the BSSHBC— signal is a binary ZERO denoting a read response and the BSMREF— signal is a binary ONE. During the third bus cycle, the address bus contains the memory address, the data bus contains the memory data, the BSLOCK— signal is a binary ZERO indicating the completion of the read modify write operation and the BSMREF— signal is a binary ZERO, and the BSSHBC— signal is a binary ZERO. In addition the BSWRIT— signal is a binary ONE. As in all other operations, the intervening time on the bus between the three bus cycles of the read modify write operation may be used by other units not involved in the transfer.

In addition to the other control signals, also provided on the bus may be the bus clear (BSMCLR—) signal which is normally a binary ONE and which becomes a binary ZERO when the master clear button, which may be located on the central processor's maintenance panel, is actuated. The bus clear signal may also become a binary ZERO during a power up sequence for example. The resume interrupting signal (BSRINT−) is a pulse of short duration which is issued by the central processor whenever it completes a level change. When this signal is received, each slave unit which had previously interrupted and had been refused, will reissue the interrupt.

The timing diagram of FIG. 7 will now be more specifically discussed in detail with respect to the address logic circuitry of a typical controller, the memory and the central processing unit.

With reference to the timing diagram of FIG. 7, in every bus cycle there are three identifiable parts, more particularly, the period (7-A to 7-C) during which the highest priority requesting device wins the bus, the period (7-C to 7-E) during which the master unit calls a slave unit, and the period (7-E to 7-G) during which the slave responds. When the bus is idle the bus request signal (BSREQT−) is a binary ONE. The bus request signal's negative going edge at time 7-A starts a priority net cycle. There is an asynchronous delay allowed within the system for the priority net to settle (at time 7-B) and a master user of the bus to be selected. The next signal on the bus is the BSDCNN− or data cycle now signal. The BSDCNN− signal's transition to a binary ZERO at time 7-C means that use of the bus has been granted to a master unit. Thereafter, the second phase of bus operation means the master has been selected and is now free to transfer information on the data, address and control leads of the bus 200 to a slave unit that the master so designates.

The slave unit prepares to initiate the third phase of bus operation beginning at the negative going edge of the strobe or BSDCND− signal. The strobe signal is delayed, for example, sixty (60) nanoseconds from the negative goind edge of BSDCNN− signal by delay line 25 of FIG. 8. Upon the occurrence of the negative going edge of the BSDCND− signal at time 7-D, the slave unit can now test to see if this is his address and if he is being called to start the decision making process of what response it is to generate. Typically, this will cause an acknowledge signal (BSACKR−) to be generated by the slave unit or in the non-typical cases a BSNAKR− or BSWAIT− signal or even no response at all (for the case of a non-existant slave) may be generated as herein described. The negative going edge of the acknowledge signal at time 7-E when received by the master unit, causes the master's BSDCNN− signal to go to a binary ONE at time 7-F. The strobe signal returns to the binary ONE state at time 7-G, which is a delay provided by delay line 25 from time 7-F. Thus, in the third phase of bus operation, the data and address on the bus are stored by the slave unit and the bus cycle will begin to turn off. The ending of the cycle, i.e., when BSDCNN− goes to a binary ONE, dynamically enables another priority net resolution. A bus request signal may, at this time, be generated and if not received, this means that the bus will return to the idle state, and accordingly the BSREQT− signal would go to the binary ONE state. If the bus request signal is present at that time, i.e., a binary ZERO as shown, it will start the asynchronous priority net selection process following which another negative going edge of the BSDCNN− signal will be enabled as shown by the dotted lines at time 7-I. It should be noted that this priority net resolution need not wait or be triggered by the positive going edge of the acknowledge signal at time 7-H, but may in fact be triggered at a time 7-F just following the transition of the bus to an idle state if thereafter a unit desires a bus cycle. This process repeats in an asynchronous manner.

Now referring to the priority net logic of FIG. 8, the priority net cycle is initially in an idle state and the bus request signal (BSREQT−) on line 10 is a binary ONE. When this bus request signal is a binary ONE, the output of receiver (inverting amplifier) 11 will be a binary ZERO. The output of receiver 11 is coupled to one input of gate 12. The other inputs to gate 12 are the bus clear signal which is normally a binary ONE and the output of gate 26 which is normally a binary ONE also. The output of gate 12, during the bus idle state is thus a binary ZERO, and thus the output of the delay line 13 will be a binary ZERO. The input and the output of the delay line 13 being a binary ZERO allows the output of NOR gate 14 (BSBSY−) to be a binary ONE. When one of the units connected to the bus desires a bus cycle, it asynchronously sets its user flip-flop 15 so that its Q output is a binary ONE.

Thus, with the bus in the idle state, the first event that occurs as the bus goes to the busy state is that the user sets its user request flip-flop 15. When both inputs to gate 16 are a binary ONE state, the output thereof is a binary ZERO. This sets the request flip-flop 17 so that its Q output (MYREQT+) is a binary ONE. Thus, in an asynchronous manner, the Q output of request flip-flop 17 will be a binary ONE. This operation can be coincidentally occurring in the similar logic of the other units connected with the bus.

The binary ONE state of the MYREQT+ signal will be placed on line 10 of the bus via driver 18 as a binary ZERO. Thus referring to the timing diagram of FIG. 7, the BSREQT− signal goes negative or to a binary ZERO state. Any request to the system from any one of the request flip-flops 17 of the various units connected to the bus will thus hold line 10 in the binary ZERO state. The delay line 13 includes sufficient delay to compensate for the propagation delay encountered by elements 14, 16 and 17. Thus, even though a device sets its request flip-flop 17, this does not mean that a higher priority device, which also requests a bus cycle, will not take the next bus cycle. For example, if a lower priority device sets its request flip-flop 17, the binary ZERO signal on line 10 is fed back to all devices, including the higher priority device, which in turn generates a binary ONE state at the output of its gate 12 so as to generate a binary ZERO state at the output of gate 14, thereby disabling the setting of the request flip-flop 17 of such other higher priority device, if in fact the user flip-flop 15 of such higher priority device had not already been set. Once the delay time of, for example 20 nanoseconds has expired and the output of line 13 of such higher priority device is now a binary ONE state, then the output of gate 14 will be a binary ZERO state so that independent of whether or not the user flip-flop 15 of such higher priority device has been set, the output of gate 16 will be a binary ONE thereby disabling the setting of request flip-flop 17. Thus during such time frame, all devices have their request flip-flop 17 set if in fact they are requesting service as indicated by the setting of their user flip-flop 15. After the delay time provided by element 13 of the device first requesting a bus cycle, a device not having had its request flip-flop 17 set cannot do so until after the bus cycle is completed. Thus the higher priority device will win the bus even if its user flip-flop is set a few nanoseconds after the lower priority device sets its flip-flop.

Thus all of the request flip-flops 17 for devices seeking a bus cycle will have been set during such interval as indicated by the delay line arrangement of delay line 13. Notwithstanding that many of such devices coupled with the bus may have their request flip-flops set during such time interval, only one such device may have its grant flip-flop 22 set. The device that has its grant flip-flop 22 set will be the highest priority device seeking the bus cycle. When such highest priority device seeking a bus cycle has completed its operation during such bus cycle, the other devices which have their request flip-flops set, will again seek the next such bus cycle and so on. Thus the Q output of request flip-flop 17 in addition to being fed to driver 18 is also coupled to one input of NAND gate 19. The Q output of flip-flop 17 is coupled to one input of AND gate 20. The other inputs to gate 19 are received from the higher priority devices and more particularly, for example, nine preceding higher priority devices. These signals received from the higher priority devices are shown to be received from the left-hand side of FIG. 8 as signals BSAUOK+ through BSIUOK+. If any one of such nine signals is a binary ZERO, this will mean that a higher priority device has requested a bus cycle and accordingly this will inhibit the current device from having its grant flip-flop 22 set and thereby disable it from having the next bus cycle.

The other inputs received by gate 19 are from the delay line 13 output and the output of NOR gate 21. The output of delay line 13 is a binary ONE and if all other inputs to gate 19 are a binary ONE, then grant flip-flop 22 will be set. The other input from gate 21 is a binary ONE when the bus is in an idle state. The inputs to NOR gate 21 are the BSACKR+ signal, the BSWAIT+ signal, the BSNAKR+ signal and the BSMCLR+ signal. If any one of these signals is a binary ONE, then the bus will accordingly be in a busy state and the flip-flop 22 cannot be set.

If grant flip-flop 22 has been set, the Q output signal is a binary ONE and will be inverted to a binary ZERO signal by inverter 23 and will then be placed on the bus on signal line BSDCNN−. This is shown in the timing diagram of FIG. 7, when the BSDCNN− signal goes from the binary ONE to the binary ZERO state. Thus, the priority cycle of the bus cycle is completed.

In addition, if the present device does require service and is the highest priority device, the two inputs received by gate 19 from delay line 13 and the BSAUOK+ priority line will be a binary ONE, however, the Q output of flip-flop 17 will be a binary ZERO thereby placing the binary ZERO on the BSMYOK+ signal thereby indicating to the next lower priority device and succeeding lower priority devices that there is a requesting higher priority device which will be using the next bus cycle, thereby inhibiting all lower priority devices from so using the next bus cycle. It should be noted that the nine priority lines received from the higher priority devices are transferred in a skewed manner by one position as signals BSBUOK+ through BSMYOK+. Thus, signal BSAUOK+ received by the present device corresponds to signal BSBUOK+ received at the next lower priority device.

Having completed a priority cycle and having now caused a binary ZERO state to be placed on the BSDCNN− line, the signal is received by all such logic as shown in FIG. 8 by receiver 24. This causes the binary ONE state to be generated at the output of receiver 24 and a binary ZERO to be provided at the output of NOR gate 26 thereby disabling AND gate 12 from generating a binary ONE state. In addition, the binary ONE state at the output of receiver 24 is received by delay line 25 which is by way of example 60 nanoseconds in duration. The output of delay line 25 is also received at the other input of NOR gate 26 so as to continue to inhibit gate 12 when the strobe is generated. Thus at the end of the delay line period established by delay line 25, the strobe (BSDCND+) signal is generated, the inversion of which, i.e., the BSDCND− signal is shown in the timing diagram of FIG. 7. The use of the strobe signal is hereinafter described. Thus the 60 nanosecond period produced by delay line 25 inhibits the priority network of FIG. 8 from functioning thereby enabling the winning device, i.e., the highest priority requesting device to utilize the next bus cycle without interference. The strobe generated at the output of delay line 25 is used by a potential slave as a synchronizing signal.

If the strobe signal has been transmitted, then the one of the units which is designated as the slave, will respond with either one of the signals ACK, WAIT or NACK received at one of the inputs of gate 21. If in the typical case, the ACK is received, for example, or if any of such response signals are received, this will reset the grant flip-flop 22. This response is shown in the timing diagram of FIG. 7 wherein the BSACKR− signal is shown to be received from the slave thereby causing the BSDCNN− signal to change to the binary ONE state by the resetting of grant flip-flop 22. The logical equivalent of the BSACKR+ signal as well as the other two signals is received by gate 28 as the BSACKF+ signal. The only difference between such signals is a few nanoseconds of delay. This causes the flip-flops 17 to reset. The BSACKF+ signal and the other two signals will only be received by the winning unit and only its request flip-flop 17 and its user flip-flop 15 are reset. Flip-flop 15 will be reset via NOR gate 29 if the grant flip-flop 22 has been set, or if the bus clear signal, as is the case for the other two flip-flops 17 and 22 is received on the bus. Thus, this process continues for each of the respective units in an asynchronous manner so as to enable one of such units connected to the bus to utilize the next bus cycle.

Figure 9:
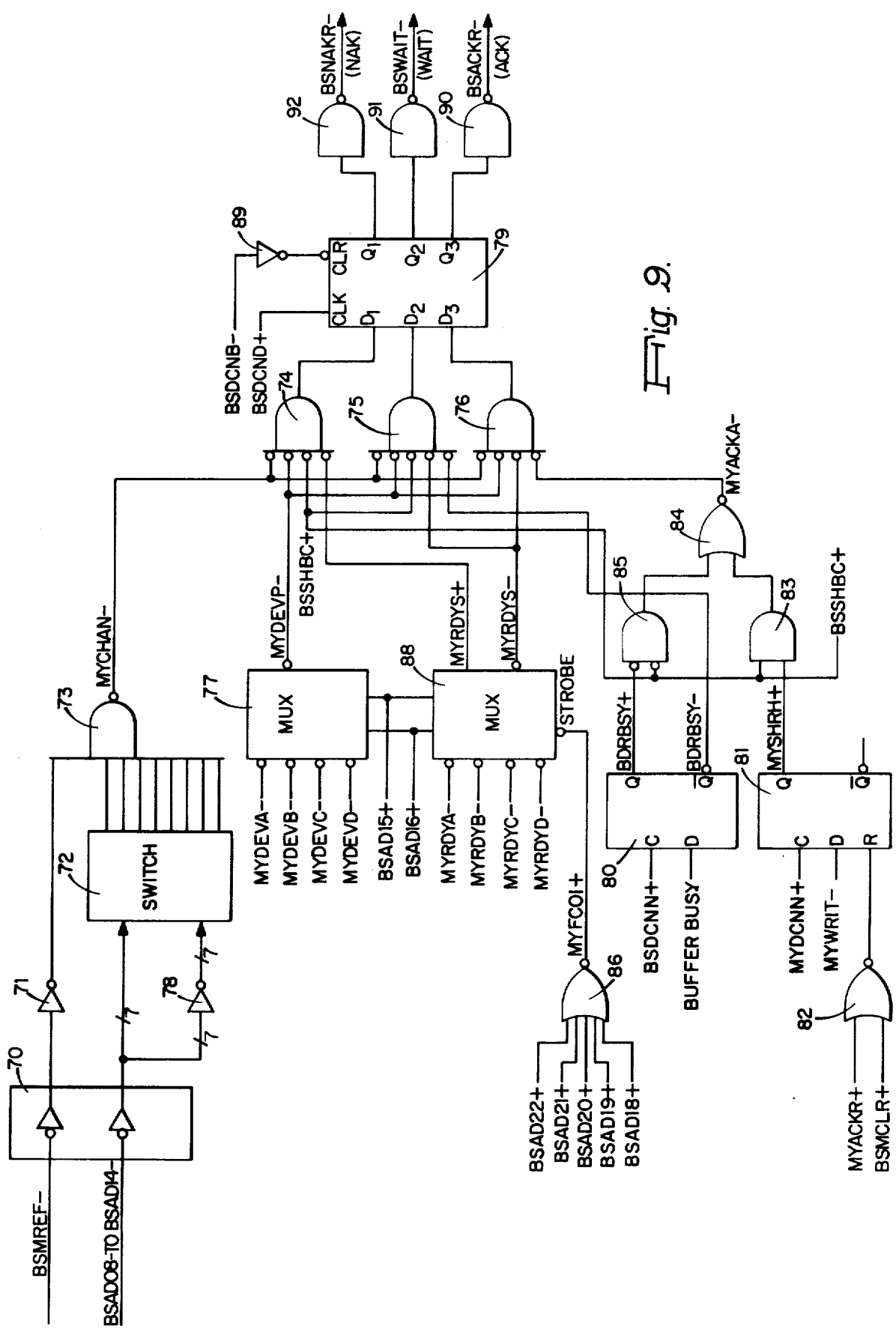
FIG. 9 illustrates bus interface logic of a typical device controller coupled with the bus of the present invention.

Now with reference to typical controller address logic as shown in FIG. 9, this logic is exemplary of controllers particularly one having up to four subunits or peripheral devices connected thereto. Element 70 includes line receivers, one for the memory reference signal BSMREF−), and the others, one each, for the bus address BSAD08− to BSAD14−. Because this logic in FIG. 9 is for a non-memory controller, the memory reference signal is a binary ONE, both at the input of element 70 and the output of inverter 71.

A switch 72 is coupled to receive the seven address leads as well as the inversion thereof via inverters 78. This switch is located in most device controllers connected to the bus 200 and is set to the address of the particular unit. With fourteen leads received at the switch, only seven are coupled at the output thereof to multiple input NAND gate 73. The bus address leads at the input side of element 70 are a binary ZERO for those bits which reflect the proper address of the desired unit. Accordingly with the inversion provided by element 70, binary ONE signals are provided at the non-inverted inputs of switch 72 for those bits of the address which were received on bus 200 as binary ZEROS. Similarly, the seven output leads from the inverters 78 have binary ONES for those positions in which the address bits are binary ONES on the incoming address bits on bus 200. With the signals at the two inputs of switch 72 the complements of each other, the switches therein, which may be a hexadecimal switch or a plurality of toggle switches, more particularly a non-ganged seven pole, two position switch, are set so that for the correct device address, all binary ONE signals appear at the seven outputs of switch 72. Thus, gate 73 will receive all binary ONE signals and will provide a binary ZERO at its output if this is the proper device address and if this is not a memory cycle as shall be explained. It can be seen that the switch 72 is arranged so as to provide a comparator function and eliminates the need for at least one level of gating and accordingly the associated propagation delay therefor. Further, the switch provides an easy means for changing the address of a particular unit thereby simplifying the manner in which a system may be configured.

The output of 73 is referred to as the MYCHAN− signal and will be a binary ZERO for the selected slave. The MYCHAN− signal is coupled to one input of each of the three NOR gates 74, 75 and 76 and, as shall be seen, is utilized to generate the ACK, WAIT, or NAK signal. The other inputs to gates 74, 75 and 76 are received as follows.

Multiplexer 77 is coupled to receive four signals from respectively up to four subunits or peripheral devices connected with the particular controller logic as shown in FIG. 9. These signals received at the inputs of multiplexer 77 indicate respectively whether or not the particular subunit is present, i.e., installed in the system. That is, one or more of such subunits may be connected. If only one is so connected, then only one of such signals will indicate the presence of a subunit. These signals indicating that the subunits are present are indicated as the MYDEVA−, MYDEVB−, MYDEVC−, and the MYDEVD− signals. Multiplexer 77 as well as multiplexer 88 to be hereinafter discussed may be that device manufactured by Texas Instruments having part number 74S151. The binary ZERO state of such signals indicates that the subunit is present in the system. The multiplexer 77 is enabled by the address signals BSAD15+ and BSAD16+ received from the bus 200 via inverting amplifiers or receivers not shown. The same two address signals are coupled to enable multiplexer 88. These two bits indicate which one of the, by way of illustration, up to four subunits or devices is being addressed. The output of multiplexer 77 is the MYDEVP− signal which, when a binary ZERO, indicates that the device addressed is present. Thus each of the gates 74, 75 and 76 receives the output from multiplexer 77 and accordingly a response from a particular controller is governed by the presence of the controller's channel number and the fact that the controller actually has the subunit attached and present in the system. As shall be discussed hereinafter, this arrangement allows continuity in addresses between one subunit to the next in a manner to be more particularly discussed with reference to the memory address logic. In general however with more than one basic device controller 210 as shown in FIG. 1 in the system, and with each such controller 210 coupled to control different types of peripheral devices, or with all such controllers 210 coupled to control the same type of peripherals 216, by selectively arranging such peripherals 216 with the controller 210, the addresses for each such subunit or peripheral may be contiguous. Further such addresses may be configured so that no matter how large or small the system, a particular address may have any type of peripheral device associated therewith.

The other multiplexer 88 is coupled to receive indications from any one of the four subunits for example to indicate that in fact such subunit is ready to receive or send data. Thus, the ready signals received by multiplexer 88 are different from the presence signals received by multiplexer 77. Whereas the presence signals indicate whether or not the particular subunit or peripheral device is installed and present in the system, the ready signal indicates dynamically whether the associated subunit is ready and capable of sending data or receiving data. These ready signals are referred to as MYRDYA+, MTRDYB+, MYRDYC+, and MYRDYD+. Receipt of the MYFC01+ signal at the strobe input of multiplexer 88 is an exception to the normal operation of multiplexer 88 and will be discussed hereinafter.

The output of multiplexer 88 labelled MYRDYS−, when a logical ZERO, enables the generation of either a WAIT signal or the ACK signal depending upon the state of the other signals received at the gates 74, 75 and 76. If a binary ZERO is generated at the MYRDYS− output of multiplexer 88, a NAK signal will be generated thus indicating that the addressed subunit is not in fact ready.

Gates 75 and 76 receive other signals, gate 75 receiving the BDRBSY− signal as shall be explained hereinafter and gate 76 receiving the MYACKA− signal from the output of gate 84. These two signals are explained with reference to the functions provided by flip-flops 80 and 81. In each controller, there is a buffer or register which accepts the data from the bus 200. If this data buffer is busy, that is, it already has information stored therein which cannot be lost, then there will be an indication that the buffer is busy and this will be received at the D input of D-type flip-flop 80, whose D input will be reflected at the Q output thereof upon receipt of the clock signal which in this case is the BSDCNN+ signal received via a driver from the bus. Thus, at the time the data cycle now signal, i.e. the BSDCNN− signal, goes to the binary ZERO state as shown in FIG. 7, if the buffer associated with this particular controller is in fact busy, then the Q output of flip-flop 80, i.e., the BDRBSY+ signal will be a binary ONE which via NAND gate 85 will be a binary ZERO. This binary ZERO state coupled to the input of NOR gate 84 will generate a binary ONE at its output, which will then inhibit gate 76 from generating an ACK signal. However, the Q output of flip-flop 80, i.e., the BDRBSY− signal will be a binary ZERO which will be provided at one input of gate 75, which if all the inputs are binary ZEROS will generate a WAIT signal. Thus, if the buffer is not busy and other conditions exist, an ACK signal will be generated. If the buffer is busy, then either a WAIT signal or a NAK signal, depending upon the other conditions, will be generated.

The flip–flop 81 is used to indicate whether or not this is a second half read cycle operation. As discussed hereinbefore, the BSSHBC−− signal is used by the master to indicate to the slave that this is the information previously requested. From the time a pair of devices coupled with the bus has started a read operation (indicated by BSWRIT−) until the second cycle occurs to complete the transfer, (indicated by BSSHBC−), both devices may be busy to all other devices on the bus. Thus, looking at the inputs of flip-flop 81, the MYDCNN+ signal clocks the flip-flop, such signal coupled to and being the logical equivalent to the Q output of the grant flip-flop 22 of the device which has become the master. Received at the D input of flip-flop 81, is the MYWRIT− signal which means that this was the particular device which started the memory read cycle and that such device is now waiting to read from the memory and that such particular device is expecting a second half read cycle to be later generated by the memory as the memory completes the cycle.

The second half read cycle history flip-flop 81 has as its reset inputs, the MYACKR+ and the BSMCLR+ signals, both coupled to the reset input via NOR gate 82. The BSMCLR+ signal acts to reset flip-flop 81 as discussed hereinbefore for various other flip-flops and the MYACKR+ signal indicates that the second half read cycle is complete. Thus if the flip-flop 81 is set, this set condition is coupled from the Q output of flip-flop 81 to partially enable one input of AND gate 83. In order to fully enable AND gate 83, the BSSHBC+ signal must be generated by the memory, indicating that this is the information previously requested. Thus, with the data coming from memory via the bus, this signal is activated and via NOR gate 84, the negative going edge of the MYACKA− signal is generated which permits the particular device to acknowledge this bus cycle by the enabling of gate 76 and via element 79, generating the ACK signal via driver 90. In addition and as indicated hereinbefore, an ACK acknowledgement may also be generated if in fact this is not a second half bus cycle and the buffer is not busy. This indication is provided by gate 85 through gate 84 in order to generate the ACK signal.

Thus, if te particular controller is waiting for a bus cycle, having had its second half read history flip-flop 81 set, then only the receipt of a second half bus cycle signal (BSSHBC+) can be responded to for this particular device. If this particular device is not waiting for a second half bus cycle then if the buffer is not busy, i.e., if there is no longer any useful information in such buffer, then an ACK signal may be generated.

In addition, the second half bus cycle signal (BSSHBC+) is received at one input of gate 74 as well as gate 75. When the second half read cycle flip-flop 81 has been set, the only output that can be obtained if this is the correct channel number, etc. as indicated by the inputs at gate 76, is an ACK signal. This is independent of whether or not the buffer is busy as indicated by flip-flop 80. Thus a NACK signal or a WAIT signal will be generated by gates 74 and 75 only if this is not a second half bus cycle signal, i.e. that the signal BSSHBC+ is a binary ZERO. In further explanation, a second half bus cycle received by the controller can come only, from the controller's point of view, from a memory and when the memory is ready to return the data to the controller, neither a NAK nor a WAIT signal can be generated, but rather only an acknowledge signal can be generated. Thus if the BSSHBC+ signal is a binary ONE, then neither the NAK nor the WAIT signals can be generated.

As indicated hereinbefore, when information is being transferred from the memory, the memory can never receive a NAK or WAIT signal. This is because of the inherent priority arrangement of the apparatus of the present invention. The memory is the highest priority device. If a unit has asked memory to send it information, then the unit can expect the information at some point in time. If the unit generates a WAIT or NAK signal to the memory, then because the memory is the highest priority device, the memory could keep trying to gain access to the particular controlller which requested the data transfer and could hang up the bus, i.e. it could because the memory is the highest priority device, cause the bus to effectively disable further data transfers until the data is accepted by the particular controller which had previously asked for it. Thus only an acknowledge signal can be made in response to a request from memory to accept data. A controller however is allowed to generate a NAK or WAIT signal to another controller or a central processor. In addition, a general rule is that if one controller requests information from a controller of higher priority, the requesting controller must be ready to accept the information, and accordingly must respond with an ACK signal.

With respect to the ready multiplexer 88, as indicated hereinbefore, if the device is not ready, then the NAK signal, other conditions being met, will be generated. The reason the NAK signal is generated rather than the WAIT signal is because of the fact that typically, if a controller such as controller 210, is busy, the terminal will be busy more than just a few microseconds, but rather will be busy for milliseconds. Thus, cycle time would be wasted if the indication to the master is that the master keep trying. Rather the indication should be that the requesting unit go on with data processing rather than unnecessarily using bus cycles thereby delaying the overall response of the system. All the requesting unit has to do is at its convenience retry the destination unit.

As indicated hereinbefore, the strobe input of multiplexer 88 receives a signal from gate 86 identified as the MYFOI+ signal. This signal is a combination of the function code of the signals received at the input of NOR gate 86, such function format code shown specifically in FIG. 3, and identified as bits BSAD18+ through BSAD22+ not used. Within these bits, the function code is indicated so that the various units connected to the bus may recognize certain codes and commands, as hereinbefore discussed. A function code of all binary ZEROS indicates to the controller that this is a privileged function code and that unconditionally, the operation presently being undertaken by the controller must be stopped and the controller initialized. In a sense, this is an emergency function code and because of this, the controller must take action regardless of the ready state of the controller. In such event, the multiplexer 88 will generate a binary ONE on the MYRDS+ output lead thereof thereby enabling either an ACK or a WAIT signal, but never a NAK signal, to be generated depending upon the state of the BDRBSY- signal which indicates whether the buffer is busy. If the buffer is busy, then a WAIT signal is generated, and if not, the ACK signal will be generated. By way of example, the central processor may generate this all binary ZEROS or emergency code in the function field if for example two seconds have elapsed and no response has been received from the device addressed. It should be understood however that the particular device addressed is the only one affected and the other three devices may in fact still be operating and accordingly this is not a clearing of the whole system connected to the particular controller. Thus, the only reason why the response to the emergency function code is dependent upon whether or not the buffer is busy is to insure that any one of the other three devices connected to this particular controller and which has information in such commonly shared buffer, has ample opportunity to save that information.

In summary, the NAK signal (BSNAKR-) is generated via driver 92 from the respective D-type flip-flop of element 79, by the full enabling of gate 74, and when BSDCND+ signal clocks such flip-flop. Gate 74 is fully enabled when the channel number is received, the device address provides as indication that it is in fact installed, that such device is not ready and that this is not a second half bus cycle. The WAIT signal (BSWAIT-) is provided on the bus via driver 91 from its D-type flip-flop included in element 79 when gate 75 is fully enabled. Gate 75 is fully enabled when the channel number is received, the device address provides an indication that it is in fact installed and that is is in fact ready, that there is an indication that this is not a second half bus cycle and that the buffer is busy. The acknowledge (BSACKR-) signal is provided on the bus by means of driver 90 in response to the D-type flip-flop included in element 79 when gate 76 is fully enabled. Gate 76 is fully enabled when the correct channel number is received, an indication that the device address as installed is provided, that such device addressed is in fact ready and that the buffer is not busy. However, should a second half cycle signal be received, then an ACK acknowledge signal will be generated independent of whether or not the buffer is busy or not. Each of the flip-flops in element 79 is cleared in response to the BSDCNB- signal received from the output of gate 26 shown in FIG. 8, via inverter 89.

Figure 10:
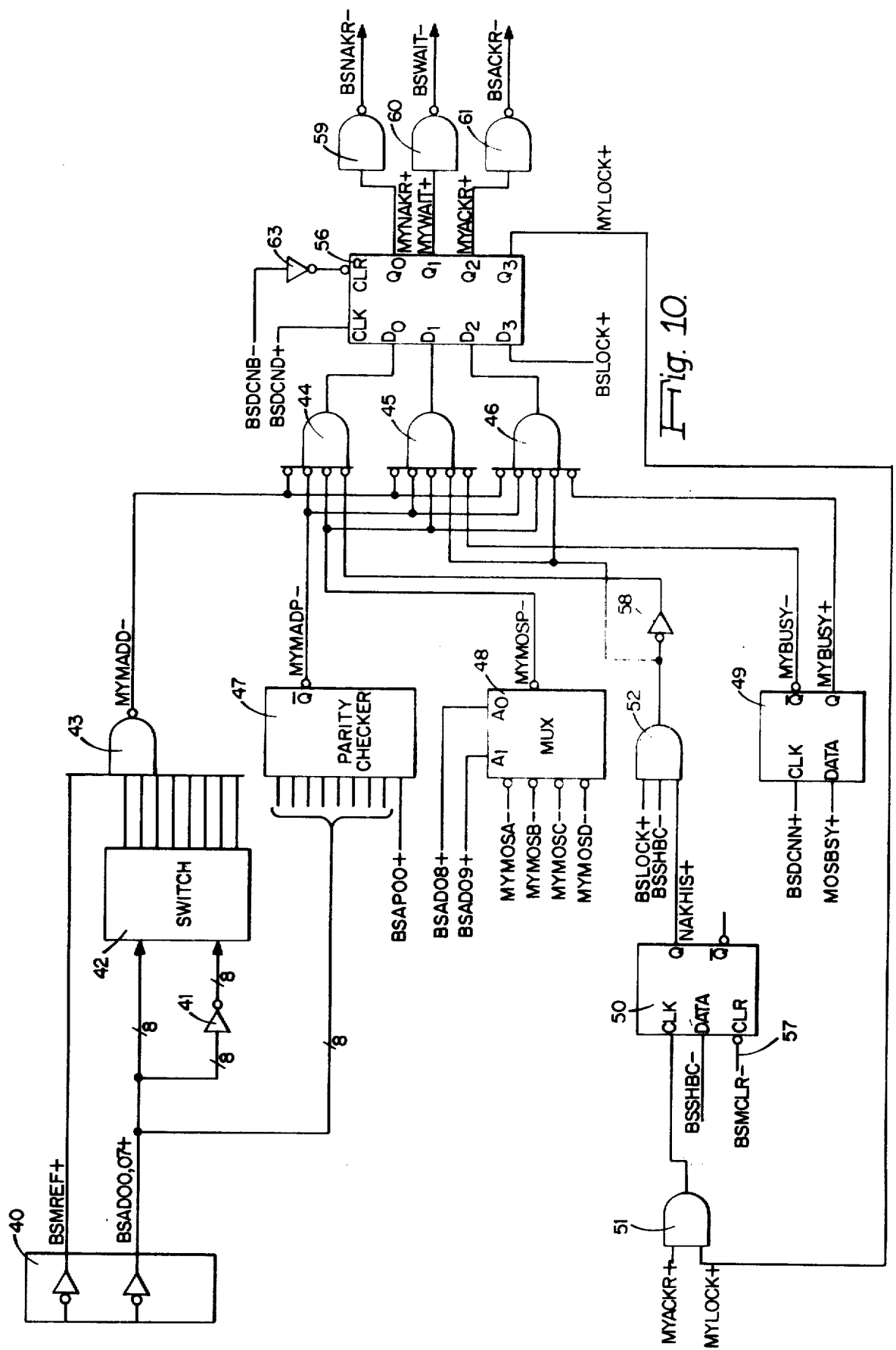
FIG. 10 illustrates bus interface logic of a typical memory controller coupled with the bus of the present invention.

Having described a typical controller's address logic, such as controller's 210 or 214, as well as controlller 212, typical address logic for a memory controller shall now be discussed. The memory controller logic of FIG. 10 is in many ways similar to the logic of FIG. 9. The address signal received by element 40 from the bus, is transferred as the bus address signals BSADO0+ through BSADO7+ in the format as shown in FIG. 2. The address signals from receivers 40 are also received at the inputs of parity checker 47 to be hereinafter described. The address signals from receiver 40 and also those at the output of inverters 41 are received by a switch 42 in the same manner as indicated for FIG. 9. If the memory reference signal (BSMREF+) is a binary ONE, and the address compared by switch 42 generates all binary ONES at the output of switch 42, then NAND gate 43 will be fully enabled to provide a binary ZERO signal on the MYMADD- line which is received at one input of each of the three NOR gates 44, 45 and 46 which are utilized to generate the NAK, WAIT and ACK signals respectively. The memory cannot be addressed unless in fact the BSMREF+ signal is in the correct binary state.

As indicated, the addressed bits are received at the inputs of parity checker 47 which in addition receives the BSAPO0+ bit which is the address parity received over the bus. Parity checker 47 makes a nine bit parity check and generates at its Q output, a signal labelled MYMADP-, which if a binary ZERO partially enables the gates 44, 45 and 46, thereby indicating that the parity is correct.

A third input to the gates 44, 45 and 46 is received from the multiplexer 48 which is analogous to multiplexer 77 of FIG. 9. Multiplexer 48 receives by way of example four inputs labelled MYMOSA- through MYMOSD— which indicate whether or not any one or all of the memory modules connected to this particular controller are actually present in the system. This allows a memory to either have a full memory module array or allows it to have a partial array, that is, only one of such memory modules may be connected in the system. These four memory modules are further addressed and via multiplexer 48 are tested to determine if they are installed by means of the two bus address signals BSADO8+ and BSADO9+.

Thus, for differently configured systems, there may be one memory module connected to one particular memory controller and there may be two such modules connected to another such controller and in fact the different memory modules connected to the different controllers may be of different types. For example, in this manner a semiconductor memory may be connected to one controller whereas a magnetic core memory may be connected to another. Further, different size, i.e., more or less storage capacity, memory modules may be used. Further, by arranging the memory modules in different controllers, then different speed memories may be used thereby increasing the speed of system response. Also, for any given controller there is normally only a given power support and timing capability and in the normal case, that controller establishes the personality of the memories that may connect to it. Accordingly, for example, if there are different types of memory speeds or different types of timing required such as for example between core and semiconductor memory, then a different controller must be utilized for each type. Further, by use of different controllers, the memories can be run faster since in fact they can be run essentially parallel in time with each other, even though they are connected to the same bus, however, only one transfer can take place at a time on a bus, the point being that the information will be ready in the memory without any access time required since in fact the access time has already taken place.

As indicated hereinbefore, each controller whether it be for memory or another peripheral device generally has its own specific address. Thus, for different memory controllers having a full complement of memory modules connected thereto, contiguous memory addresses may be provided. More specifically, assuming that each memory controller has four memory modules coupled thereto, and that each such module has the capability of about 8,000 words of storage, then each such memory controller will be able to provide access to 32,000 words of storage. With a full 32,000 words of storage coupled in the system for each memory controller, the addresses of the memories are contiguous. From an operations point of view, contiguous memory address is important not only for purposes of system addressing, but also for increased response in the system. As mentioned before, typically the memory controller can only provide service for a memory of a certain characteristic, i.e. a magnetic core memory cannot be coupled to the same memory controller as a semiconductor memory because of the basic timing differences associated therewith. The same is normally true for memories of different speeds or power requirements. Thus, assuming again that each memory controller may provide service for 32,000 words of memory, if only 16,000 words of memory are to be used for low speed memory and another 16,000 words are to be used for high speed memory, this means that two memory controllers must be used. However, this would typically mean that the memory addresses between the high speed and the low speed memory would not be contiguous because the memory controller addresses are 32,000 words apart. In this case, it is possible to provide contiguous memory addresses by allowing both of the memory controllers to have the same address. However, this would also mean that the respective memory module positions of the two controllers could not be both occupied in the same location in each such controller. More specifically, the first controller would utilize two 8,000 word storage locations in memory module positions A and B as indicated by the MYMOSA− and MYMOSB− signals. The other controller would utilize the other two memory module positions, the presence of which would be indicated by the MYMOSC− and MYMOSD− signals. Thus, these two controllers appear in the system as if they were one controller. By way of further example, one such controller may have simply 8,000 words of one such memory coupled therewith in the form of one module, whereas the other memory module with the same address may have coupled therewith up to three such memory modules in the other three positions to accordingly provide 24,000 words of memory storage. This arrangement need not necessarily be limited to different types of memories, but in fact may address the problem of defective memory modules coupled with a controller. For example, a redundant memory module may be provided coupled with another controller whose device address may be set as may be appropriate upon detection of a failure in such memory module.

Referring again to the enabling of gates 44, 45 and 46, each of such gates in order to be enabled and allow a response from this particular memory controller, must receive its memory controller's address, an indication that the module addressed exists in the system, and that the address parity is correct, as indicated by parity checker 47. The other inputs to the NOR gates are serviced from a combination of busy logic and lock history logic as presently described.

The memory controller busy signal is provided by flip-flop 49 and indicates that any one of the memory modules connected to this controller is in fact busy. This D-type flip-flop 49 is clocked by the BSDCNN+ signal. If a memory module is busy, then a WAIT signal will be generated. Thus, if the MYBUSY− signal at the Q output of flip-flop 49 is a binary ZERO, this enables, if the other conditions are met, gate 45 to be fully enabled and to set the associated flip-flop in element 56, it being noted that this is done when the BSDCND+ signal is received at the clock input of element 56. At this point it is noted that this flip-flop element 56 is cleared via inverter 63 when the BSDCNB- signal is received as was the operation for element 79 of FIG. 9. The acknowledge signal will be generated when a binary ZERO is generated at the Q output of flip-flop 49 as indicated by the MYBUSY+ signal coupled to one input of gate 46. It is again noted that the WAIT signal means that there will be a very short delay since the memory is still busy.

The other condition which indicates which of the ACK, NAK or WAIT signals is to be generated, is the lock signal which as indicated hereinbefore comprises a multi cycle bus transfer whereby a device can access a specific memory location without any other locked unit being able to break into the operation. The effect of this locked operation is to extend the busy condition of the memory controller beyond the completion of a single cycle for certain kinds of operations. Devices attempting to initiate a lock operation before the last cycle of the sequence is complete will receive a NAK signal. The memory will however still respond to a memory request as shall be presently explained. It is noted that the intervening time between these cycles may be used by other units not involved in the transfer. A locked operation is used primarily where it is desirable for two or more units or devices to share the same resource, such as memory for example. The locked operation, which can include any number of bus cycles, is unlocked by the particular unit or device which has had control of the shared resource. While the shared resource is locked, other units desiring to access the shared resource will be locked out if such other units present the lock control signal. If the lock control signal is not presented, it is possible for such other unit to gain access to the shared resource such as for example to process an urgent request or procedure. Before any unit presenting the lock control signal gains access to the shared resource, it tests the resource to see whether it is involved in a locked operation and then during the same bus cycle, if the resource is not involved in a locked operation, it may gain access to the resource.

Thus, it can be seen that the locked operation for sharing a resource is one that is effective between those units which issue the appropriate controls, i.e., the lock control signal, and may be used for example in sharing a portion of memory in which a table of information may be stored. Further, if one of the units desires the change information in the shared resource, other units may be locked out so that they do not gain access to only partially changed information, but rather are allowed access only after all such changes have been made. A read modify write operation may be involved in such case. By use of the locked operation, it can be seen that a multiprocessing system may be supported. For example, with two central processing units connected to the same bus 200, both may share the memory units connected to the bus without interference if the locked operation is used.

It is noted that the BSSHBC− signal for the locked operation, as shall be seen, is used in a somewhat different manner than has been heretofore discussed. During the locked operation, the BSSHBC− signal is issued by the unit attempting to share a resource both to gain access to the shared resource by means of a test and lock procedure and to unlock the shared resource when it has completed its locked operation.

Thus as can be seen by FIG. 10, a lock history flip-flop 50 is provided, which if set indicates that a locked operation is in process, thereby enabling a NAK signal to be issued to a requesting unit via driver 59. Assuming that the logic of FIG. 10 represents the bus 200 interface logic for the shared resource, the BSLOCK+ signal )binary ONE state) is received by both AND gate 52 and flip-flop D3 of element 56. Element 56 thereby generates the MYLOCK+ signal which is received at one input of AND gate 51. If the lock history flip-flop is not set, the NAKHIS+ signal will be a binary ZERO thereby, independent of the state of the other two inputs to gate 52, generating a binary ZERO at one input of gate 46. If all inputs of gate 46 receive a binary ZERO, thereby indicating that the current address for this unit and device were received, and that the common element or buffer is not busy, then an ACK signal will be generated via element 56 and driver 61 in response to the BSLOCK+ signal. The ACK signal will fully enable AND gate 51 to set the history flip-flop 50 in response to the binary ONE state of the BSSHBC− signal at the D input thereof which is received with the binary ONE state of the BSLOCK+ signal at the commencement of the locked operation. Thus, a test and lock operation is performed during the same bus cycle.

If flip-flop 50 had already been set at the time of the receipt of the binary ONE state of the BSLOCK+ and BSSHBC− signals, then a binary ONE signal will be generated at the output of AND gate 52 thereby generating a binary ZERO state at the output of inverter 58 so as to enable AND gate 44, all other conditions having been met, to generate the NAK signal. Thus, the test and lock operation would have produced a NAK response inhibiting another unit from using the shared resource.

Once the unit using the shared resource is through with its operation, it must unlock the resource. This is done by receipt from the user unit of the binary ONE state of the BSLOCK+ signal and the binary ZERO state of the BSSHBC** signal. This enables the logic of FIG. 10 to provide an ACK response, enabling gate 51 and thereby effectively resetting history flip-flop 50 because of the binary ZERO state of the BSSHBC− signal. The shared resource is now free to make an ACK response to other units.

It can be seen that the shared resource will only lock out other units which present the binary ONE state of the BSLOCK+ signal. If a unit, for example, desires to gain access to a shared resource which had its history flip-flop set so that the NAKHIS+ signal is a binary ONE, then, if the BSLOCK+ signal is a binary ZERO, the output of AND gate 52 will be a binary ZERO, thereby disabling a NAK response and enabling, dependent upon other conditions, either a WAIT or ACK response. Thus, a unit may gain access to a shared resource even though it is involved in a locked operation.

Thus, it can be seen that the generation of a WAIT signal from any one of the controllers allows a device or controller of higher priority to break into the sequence of the bus cycles and use the bus as necessary. If there is not a higher priority unit which is requesting service, the particular master/slave arrangement will be maintained until the acknowledge is received by the master thereby ending the WAIT condition. Following this, another user is allowed to use the bus. Thus, the BSDCNN+ signal allows a slave to generate any one of three responses, either the NAK, WAIT or ACK signals. At the end of any one of these responses, a new priority net cycle occurs and this particular device gains access to the bus or another higher priority device wins the bus. It should be understood at this point that signal states on the bus are the inverse in binary state to those signals shown internal to the units. For example, the memory reference signal is referred to on the bus, between for example drivers 59, 60 or 61 and receivers 40, to be in one state and in the opposite state in the controllers themselves. Further, as indicated hereinbefore, a fourth response between any of the controllers connected on the bus is that there is no response at all. Thus, if one of the masters is calling for service from the memory and this memory is not installed in the system, a time out element, well known in the art, will generate a signal after a certain period of time, such as for example 5 microseconds, thereby generating a NAK signal. At that point, a central processor may take action such as by an interrupt or trap routine.

Referring again to the operation of the memory busy flip-flop 49, the data input is coupled to receive the MOSBSY+ signal which is asynchronous to the bus operation. This signal may be received at any time regardless of the operation which is occurring on the bus for any controller. When the BSDCNN+ signal is received from the master at the clock input of flip-flop 49, a history is stored as to the state of the memory, i.e. whether it is busy or not at that time. Thus, this eliminates confusion in the response to the bus cycle. Without the history retention provided by flip-flop 49, it would be possible to start out the bus cycle in a WAIT condition and end up the same bus cycle in the state which generates an ACK condition. Thus, both responses would be made during the same bus cycle which would thus be an error condition. By use of history flip-flop 49, the response is fixed as to the condition which the controller was in at the time the BSDCNN+ signal is received, thereby allowing an asynchronous response and regardless of the tolerance or difference in memory speed.

Figure 11:
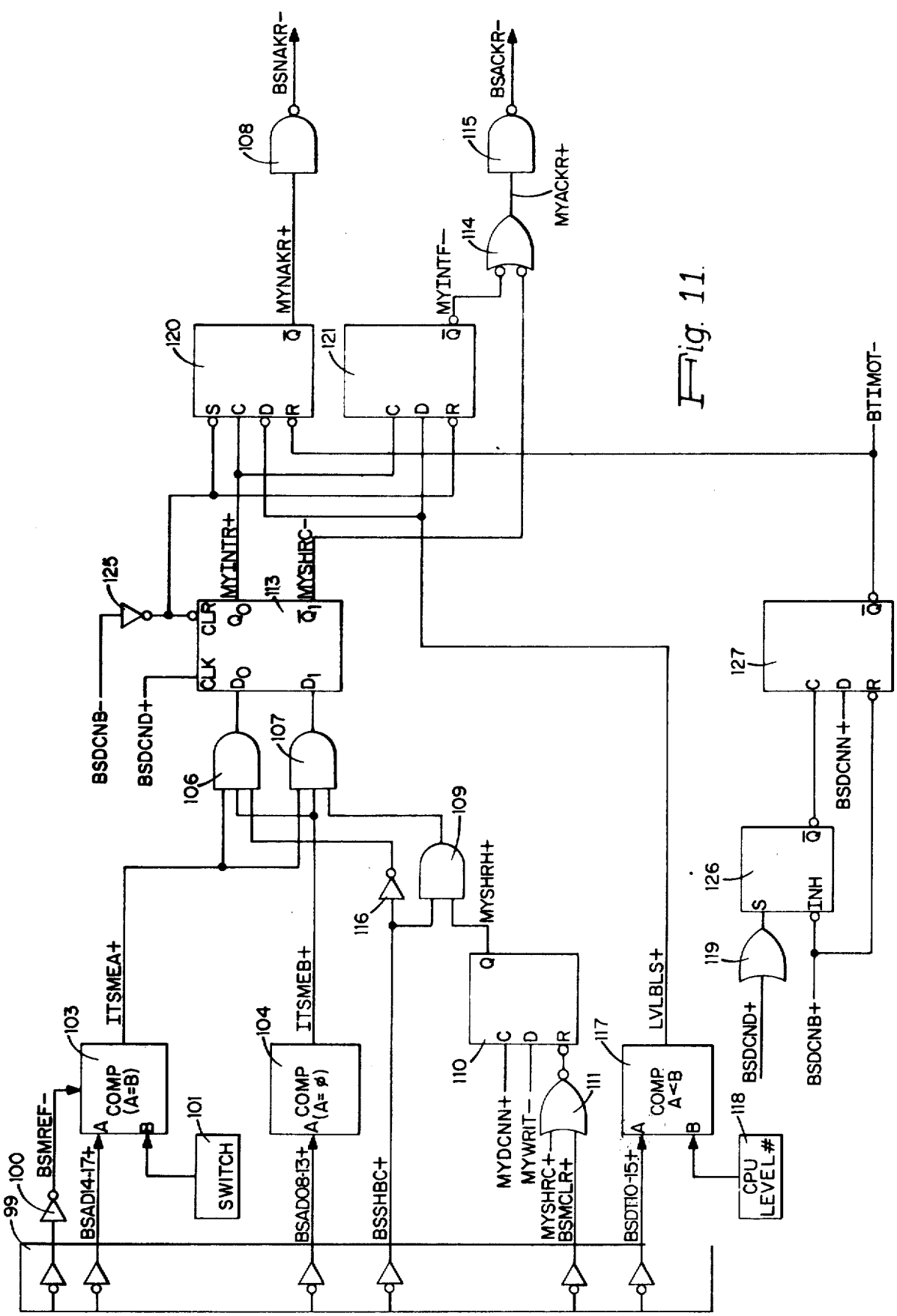
FIG. 11 illustrates bus interface logic of a data processor coupled with the bus of the present invention.

Now referring to the typical central processor bus coupling logic of FIG. 11, the signals are received from the bus by means of the receivers included in element 99. The memory BSMREF− is received by one of such receivers and inverted by means of inverter 100 and provided to one input of comparator 103 so as to enable such comparator if the address being received is not a memory address. One of the inputs for comparison by comparator 103 is the data processor address bits which in this case by way of example are four in number and are indicated as the BSAD14+ through BSAD17+ signals. This address received at one input of comparator 103 is compared with the address set by for example the hexadecimal switch 101 in the data processor itself. When the received address and the switch 101 provided address are compared and found to be equal, then comparator 103 generates ITSME+ signal which partially enables gates 106 and 107.

Further address bits BSAD08+ through BSAD13+ are received at the inputs of comparator 104 which determines whether or not these bits are all ZEROS. If they are all ZEROS, then the ITSMEB+ signal is generated to also partially enable gates 106 and 107. Enabling of further input of either gates 106 or 107 will effectively set a respective flip-flop in element 113.

The other input to gate 106 is a second half bus cycle BSSHBC+ signal which is coupled to gate 106 via inverter 116. The second half bus cycle is also received at one input of AND gate 109. The other input to gate 109 is from the Q output of the second half read history flip-flop 110. The second half read history flip-flop is utilized to remember that the data processor issued its MYDCNN+ signal, i.e., the setting of this device's grant flip-flop 22, and that the central processor also sent the signal entitled MYWRIT−, which implies that the data processor is expecting a response cycle from the slave. Thus with such a two cycle operation, the second such cycle presents the expected data to the central processor, and the flip-flop 110 will identify this data as being that which the central processor requested by the fact that the history flip-flop has generated the MYSHRH+ signal at the Q output thereof. Flip-flop 110 is reset via NOR gate 111 if the bus clear signal BSMCLR+ is received or if the second half bus cycle has been completed as indicated by the MYSHRC+ signal. The MYSHRC+ signal is derived from one of the outputs of element 113 to be hereinafter discussed.

Thus AND gate 107 will be fully enabled if two of the inputs thereto indicate that this is the addressed device and that from the other input thereof, there has been a second half bus cycle as indicated via AND gate 109 from history flip-flop 110. Thus, by the enabling of AND gate 107 the MYSHRC− signal will be generated and will be coupled to one input of NOR gate 114. NOR gate 114 will provide an ACK signal, (BSACKR−) via driver 115.

Gate 106 will be fully enabled when the proper unit address is received and if this is not a second half bus cycle, which thereby generates a positive pulse labelled as the MYINTR+ signal at the output of the respective flip-flop included in element 113. The MYINTR+ signal causes the logic of FIG. 11 to determine whether or not an ACK or a NACK signal will be generated. Which one of such signals is generated will depend on the interrupt level that is presently operating in the system as compared to the interrupt level of the device seeking processing time.

This decision regarding whether or not the interrupt level is sufficient is determined by means of comparator 117, which is a comparator for determining whether or not the A input is less than the B input. The A input of comparator 117 receives the BSDT10+ through BSDT15+ signals which indicate in the format shown in FIG. 5, the interrupt level of the device coupled with the bus which is seeking data processing time. There are a plurality of interrupt levels provided in the system. Interrupt number level 0 receives the highest possible accessibility to data processing time and accordingly is non-interruptable. Thus the lower the interrupt level number, the less chance there is that such device's ongoing processing will be interrupted. Thus if the level number received at the A input of comparator 117 is less than the current level operating in the data processor as indicated by the level number in block 118, then the device seeking to interrupt as indicated by the signal received at input A will in fact be able to do so. If the A input is equal or greater than the B input, then the LVLBLS signal will not be generated and a NAK signal will be provided by the driver 108 and flip-flop 120, as shall be hereinafter described.

Thus if the interrupt level received at input A of comparator 117 is less than that received at input B, the LVLBLS+ signal will be a binary ONE and will be coupled to the D input of both flip-flops 120 and 121, it being noted that the D input of flip-flop 120 is an inversion. If the A signal is equal to or greater than the B signal as indicated by comparator 117, then a binary ZERO signal will be generated for the LVLBLS+ signal which will be received at the negation input of flip-flop 120. This will generate the NAK signal if the MYINTR+ signal is received at the clock input of flip-flop 120 by the setting of the respective flip-flop in element 113. If the level was sufficient, i.e. if the A input was less than the B input as indicated by comparator 117, then a binary ONE will be generated at the LVLBLS+ signal and accordingly the MYINTR+ signal will clock this to the Q output of flip-flop 121 into one input of NOR gate 114 which via driver 115 will generate the ACK signal. Thus if the MYNAKR+ signal is a binary ONE, then the NAK signal will be generated and if the MYINTF− signal is a binary ZERO, an ACK signal will be generated. The flip-flops in element 113 are clocked and cleared by inverter 125 in the same manner as previously discussed for similar flip-flop type elements. It should be noted that an ACK signal will be generated independent of the indication by comparator 117, if in fact this is the second part of the second half bus cycle. In such event, the MYSHRC− signal in one of the flip-flops of element 113 is coupled in the binary ZERO state to the other input of NOR gate 114 so as to generate the ACK signal thereby overriding any indication from flip-flop 121.

As indicated hereinbefore, the BSDCNB− signal via inverter 125 resets flip-flop 121 and in addition sets flip-flop 120, thereby initializing the flip-flops following the bus cycle. In addition, flip-flop 120 is reset by the logic associated with flip-flop 127 which generates a BTIMOT− signal indicating a time out condition, i.e., that a non-existent device was addressed and that in fact no response, neither a NAK, an ACK or a WAIT has been generated by any potential slave device. Accordingly, there is provided a one-shot multivibrator 126 which may be set to have a 5 microsecond period for example. This multivibrator 126 is triggered by the receipt of the BSDCND+ signal, i.e. the strobe signal, which is received at the input of buffer 119. Since the timing of the multivibrator 126 is in motion, if a BSDCNB+ signal is not received which signal indicates the end of the bus cycle, then after the period set by multivibrator 126, the BTIMOT− signal is generated at the Q output of flip-flop 127 via the clocking of the BSDCNN+ signal received at the D input of flip-flop 127, it being noted that the BSDCNN+signal indicates that the bus cycle is still in process. The BTIMOT− signal operates on flip-flop 120 to generate a NAK signal. If on the other hand, the BSDCNB+ signal terminates before the end of the period set by multivibrator 126, the timing of multivibrator 126 is terminated and flip-flop 127 is prevented from generating the signal BTIMOT−.

It is noted that the data processor logic in FIG. 11 generates either a NAK or ACK signal, however a WAIT signal is not so generated by the data processor logic. The reason for this is that the data processor always has the lowest priority and accordingly, if it generates a WAIT signal, the other devices generating their requests to the data processor for service will possibly experience a hang up on the bus, if for example a higher priority device was the master to which the central processor responded with a WAIT signal. Thus, just because the higher priority device is waiting for the lowest priority device, i.e., the central processor, other devices will be disabled from using the bus.

In further explanation of the present invention, it can be seen that the integrity of information transferred over the bus may be insured without the necessity of adding a parity bit for each byte of information transferred on the bus. This integrity may be provided for any units which transfer information therebetween. More particularly, this may be facilitated in those cases where a master unit in its request expects a response from a slave unit. Thus, the integrity of such data transfers may be best facilitated in those situations where two bus cycles are utilized in a bilateral bus transfer. This is particularly advantageous for example in a memory read operation wherein the master requests information from the memory and, during a later bus cycle, receives such information. It has been found, for example, that a substantial number of data transfers occur between the memory and another device during a read operation which requires two bus cycles and accordingly the data integrity feature of the invention is particularly important in such case.

Figure 4:

Basically, the integrity apparatus takes advantage of the fact that when a master addresses another unit, which may be for example a memory or a tape or disk peripheral unit, for information, the master places the address of the slave unit on the address leads on the bus and its own address and function code on the data leads of the bus. When the slave responds, and in so responding is the master, the slave then places the requesting unit's address on the address leads and the data on the data leads. Thus, the requesting unit's address is received back on address leads as opposed to the transfer thereof initially on the data leads. The requesting device then compares its address, i.e., its addresses transferred on the data leads with the address now received on the address leads, and if they compare, this insures that in fact its device address was received properly by the slave and that in addition, if the opcode is also received back, the opcode was received satisfactorily. Thus, for 16 bits of information as shown in the format of FIG. 4, up to two parity bits are eliminated while maintaining the integrity of the data transfers in the system.

Figure 12:
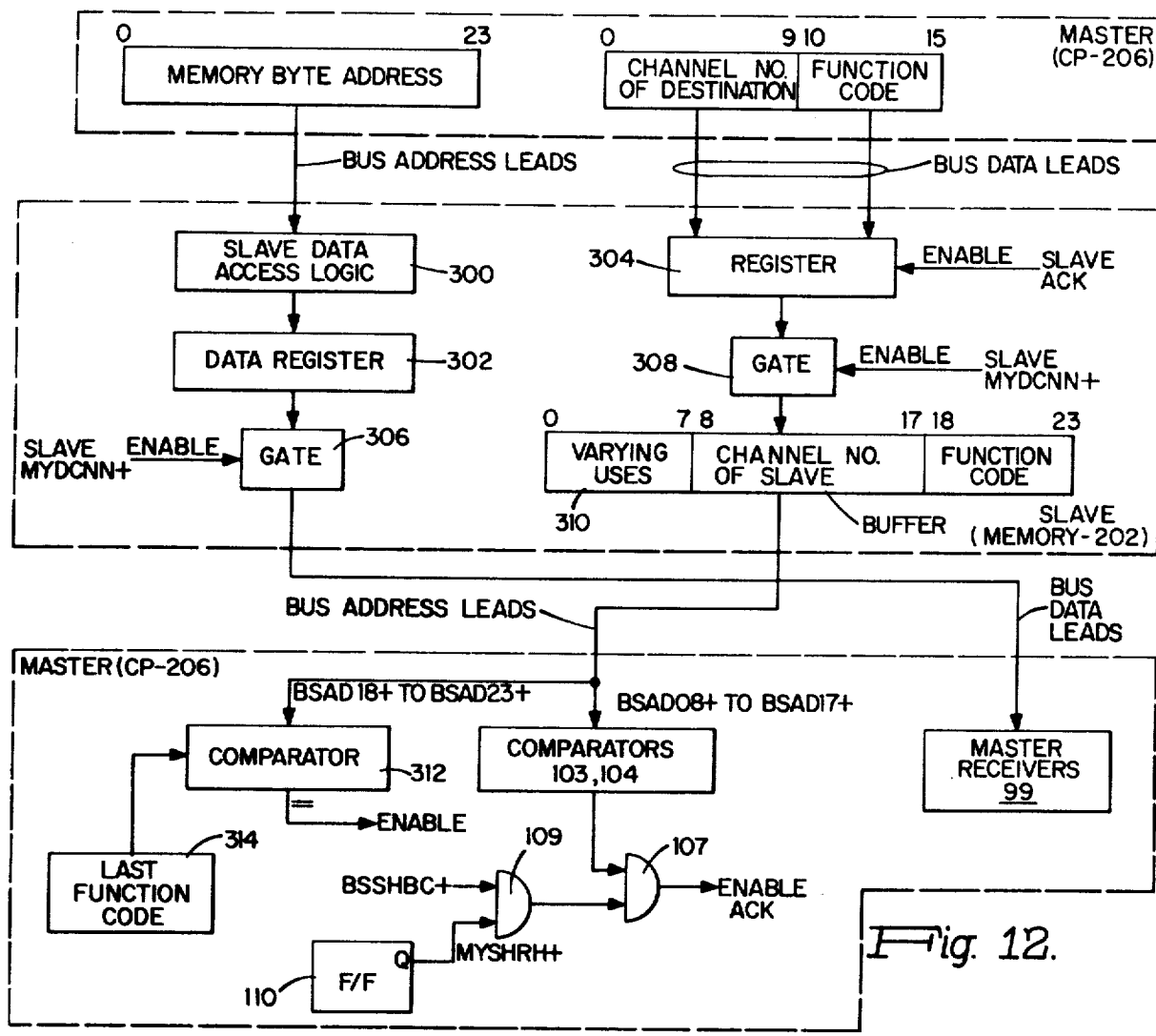
FIG. 12 illustrates data integrity apparatus utilized in the present invention.

Now referring to FIG. 12, the redundancy check of the present invention for insuring the integrity of the data transfers is more particularly shown. By was of example, FIG. 12 specifically illustrates the manner in which this redundancy check is provided when the data processor is requesting information from the memory. More specifically, when the master in this case, central processor 206, desires to read information from a memory 202, which in this case is the slave, then th master will transmit the memory byte address in the format of FIG. 2 over the bus address leads and will also transfer its, i.e. the central processor's channel address number, bits zero through nine of the bus data leads, as well as its opcode or function code, bits 10 through 15 of the bus data leads. The information on the bus address and data leads will be received by the slave and in response to the address on the bus address leads, will access the data via well known memory data access logic 300. The data accessed will then be stored in register 302. The information on the bus data leads being received by register 304 of the slave will not be stored therein unless the slave acknowledges this request with an ACK signal, thereby accordingly enabling register 304 to store such data.

The data in register 304 will not be transferred back over the bus address leads, nor will the data from register 302 be transferred over the bus data leads, until in fact the memory gains access to the bus via its priority logic by the setting of its grant flip-flop 22 as shown in FIG. 8, thereby generating its MYDCNN+ signal. Thus, with the MYDCNN+ signal generated, a gate 306 and a gate 308 are enabled to respectively transfer the data over the data leads to the master's receivers 99 for use by the master, and via buffer 310 information over the bus address leads to the master's rceiving logic.

Basically only the bits 8 through 23 which comprise 16 bits are used since this is the information which can be verified by the master in order to insure the integrity of the data transfers. This is because in fact that particular information was transferred from the master to the slave over the data leads and is now being received on the address leads. Thus, the channel number of the destination in accordance with the format of FIG. 3 is received by comparators 103 and 104 of the logic shown in FIG. 11. The function code which was in bit locations 18 to 23 of the format shown in FIG. 3 is received by comparator 312. If this information received by comparator 312 compares with the last function code 314 sent by the master in the function code bits 10 through 15 of the format of FIG. 4, then an enable signal is generated allowing the system to perform its normal operation. Alternately, the function code received back may simply be checked to be sure it is a legal and valid code. If comparators 103 and 104 indicate an equal condition as shown more specifically with respect to FIG. 11, then gate 107, also shown in FIG. 11, will enable th ACK acknowledge signal. Gate 107's other input will have been set by the previous setting of the second half read history flip-flop 110 as well as the indication received from the slave that this is the completion of the second half bus cycle as indicated by the signal BSSHBC+ received at the other input of gate 109. Gate 109's output then fully enables gate 107. Thus, it can be seen that comparators 312, 103 and 104 as well as the associated logic shown in FIG. 12 coupled to the address leads of the bus, effectively provide a comparator which compares the information prevously sent by the master on the data leads and the information received back from the slave on the address leads, thereby substantially insuring the integrity of both data transfers and eliminating a need for extra parity bits.

Figure 13:
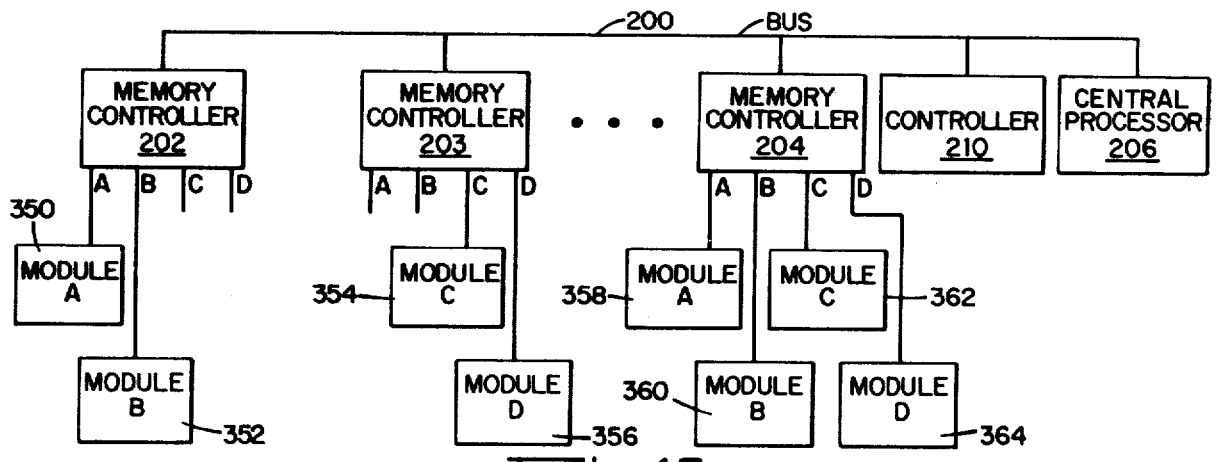
FIG. 13 illustrates an addressing technique of the present invention.

The manner in which the apparatus of the present invention enables the addressing of contiguous memory space, independent of the mix of memory types based on speed, type, i.e., magnetic core or semiconductor, and other characteristics, is more particularly explained with respect to FIG. 13. The bus 200 is shown coupled to memory controllers 202, 203, 204, as well as the other controllers such as controller 210 and the central processor 206. As discussed hereinbefore, by way of example, each memory controller is capable of addressing memory modules up to four in number. These modules may be connected to positions A, B, C and D of the respective memory controller. Each memory controller receives its own address as well as the address of the module associated therewith. The module address is received as two bits over the bus 200, such bits designated as BSADO8+ and BSADO9+ as shown in FIG. 10. The memory controller's address is received as bits BSADOO+ through BSADO7+. Thus, only the memory module whose controller is addressed will respond. Therefore, as can be seen for the normal case, memory controller 204 has connected to its positions A, B, C and D, memory module A-358, memory module B-360, memory module C-362, and memory module D-364. If memory controller 204 is addressed and the two bit sub-address designates for example module C-362, then module C will respond.

As indicated hereinbefore, if there should be a mix in memory types as indicated by the above-mentioned characteristics for example, and should such mix be less than the full memory controller complement which was previously given by way of example as 32,000 words of storage, wherein each module contains 8,000 words of storage, then contiguous memory addresses will not be available, since address space of 32,000 words of memory must be left available for each memory controller in order to be able to increase the memory capacity of the system at a later date. As shall be seen in FIG. 13, it is possible to utilize only a portion of each of such memory controllers in order to provide such contiguous addressing.

Thus, referring to FIG. 13, and assuming that module A-350 and module B-352 are of one memory type and that module C-354 and module D-356 are of a different memory type, then memory controller 202 may be connected to control the access of modules A and B and memory controller 203 may be connected to control the access of modules C and D. In such case memory controller 202 and memory controller 203 will have the same address. In such configuration, the positions C and D of controller 202 and positions A and B of controller 203 will not be available for use unless the system is completely reconfigured. Thus, when both memory controllers 202 and 203 see their address, i.e., the same address, then they both seek to respond, dependent however upon which module A, B, C or D is addressed by the two module address bits BSADO8+ and BSADO9+ received on bus 200. Thus only one controller 202 or 203 will respond dependent upon which of the modules is addressed.

The above was by way of illustration only, it being understood that for example more than four such modules may have been coupled with a given controller and by way of the present example, for example controller 202 may have been connected to just one module A and controller 203 may have been connected to modules B, C and D in the same respective positions. It can also be seen by the present example, that if a third module was connected to position C of controller 202 and module C-354 is connected to controller 203, that if such module C was addressed and controllers 202 and 203 had the same address, then both such controllers would respond in response to receipt of their identical address and the module C address thereby causing an error condition. It has thus been seen how contiguous addresses may be obtained by use of the present invention independent of the memory characteristics coupled in the system.

While the invention has been particularly shown and described with reference to preferred embodimwents thereof, it will be understood by those skilled in the art that the foregoing and other changes in form and details may be made therein without departing from the spirit and scope of the invention.

Having described the invention, what is claimed as new and novel and for which it is desired to secure Letters Patent is:

1. A data processing system comprising a plurality of units coupled to transfer information over a common electrical bus between any two of said units during asynchronously generated information transfer cycles, said system further comprising:
   A. means, included in a first one of said units, for enabling the transfer of first information to a second one of said units during a first transfer cycle, said first information indicating a request for a further transfer of information from said second one of said units to said first one of said units;
   B. means, included in said second one of said units and responsive to said first information, for enabling the transfer of second information to said first one of said units during a later transfer cycle asynchronously generated at a point in time following said first cycle; and
   C. means, included in each of said units, for enabling the transfer of information between any two of said units except said first and second ones of said units, during any transfer cycle generated between the time said first cycle and said later cycle are generated.

2. A system as in claim 1 further comprising:
   A. means, included in said first one of said units, for storing an indication that said first information, requesting a return transfer of information, has been transferred from said first one of said units; and
   B. means responsive to said indication of said means for storing, for inhibiting any other said unit from transferring information with said first one of said units.

3. A system as in claim 2 further comprising:
   A. means, included in said second one of said units and responsive to said first information, for transferring a response request control signal to said first one of said units; and
   B. means, included in said first one of said units and responsive to said response request control signal, for receiving said second information.

4. A system as in claim 1 further comprising:
   A. means, included in said first one of said units, for storing an indication that said first information, reqesting a return transfer of information, has been transferred from said first one of said units; and
   B. means, responsive to said indication of said means for storing, for inhibiting any other said unit having a level of interruptability lower than a predetermined level, from transferring information with said first one of said units.

5. A system as in claim 1 further comprising:
   A. means, included in said first one of said units, for indicating the level of interruptability of said first one of said units; and
   B. means, included in said first one of said units, for enabling the transfer of information with said first one of said units during any one of said transfer cycles, including said later cycle, if the interrupt level of the unit from which said information is to be transferred is more significant than said level of interruptability of said first one of said units.

6. A system as in claim 5 wherein said first one of said units is a data processing unit.

7. A system as in claim 1 further comprising:
   A. means, included in each of said units, for indicating the one of said units having the highest priority;
   B. means, included in each of said units, for asynchronously requesting a transfer cycle; and
   C. means, included in each of said units and responsive to said means for indicating and said means for requesting, for generating a transfer cycle, if the particular unit generating a transfer cycle has requested a transfer cycle and if said particular unit is the highest priority unit.

8. A system as in claim 7 further comprising:
   A. means, included in said first one of said units, for storing an indication that said first information, requesting a return transfer of information, has been transferred from said first one of said units; and
   B. means, responsive to said indication of said means for storing, for inhibiting any other said unit from transferring information with said first one of said units.

9. A system as in claim 7 further comprising:
   A. means, included in said first one of said units, for storing an indication that said first information, requesting a return transfer of information, has been transferred from said first one of said units; and B. means, responsive to said indication of said means for storing, for inhibiting any other said unit, having a level of interruptability lower than a predetermined level, from transferring information with said first one of said units.

10. A data processing system comprising a plurality of units coupled to transfer information over a common electrical bus between any two of said units during asynchronously generated information transfer cycles, said units having a priority based on the relative positions of said units from one end of said bus, said system comprising:
  A. means, included in each of said units, for generating a transfer cycle if said unit is the highest priority unit requesting said transfer cycle;
  B. transfer logic, included in a first unit, having
    1. means for enabling the transfer of first information to a receiving one of said units during a first transfer cycle, if said first unit is the highest priority requesting unit, said first information indicating that second information is requested from said receiving unit, and
    2. means for indicating that said first information has been transferred;
  C. means, included in said first unit, and including said means for indicating, for inhibiting the transfer of information with any other unit until said first unit receives said second information from said receiving unit; and
  D. control means, included in each of said units, for enabling the transfer of information between any two of said units except said first unit, at any time between the generation of said first cycle and the transfer of said second information.

11. A system as in claim 10 wherein said control means or enabling includes means for enabling the transfer of information between any two of said units, except said first unit and said receiving unit.

12. A system as in claim 10 further comprising:
  A. means, included in said first unit, for indicating the interruptability of said first unit; and
  B. means, included in said first unit, for enabling the transfer of intormation with said first unit during any of said transfer cycles occurring at any point in time, if the interruptablity of said first unit is greater than the interruptability of a one of said units seeking to transfer information with said first unit.

13. A data processing system comprising a plurality of units coupled to transfer information over a common electrical bus between any two of said units during asynchronously generated information transfer cycles, said units having a priority based on the relative positions of said units from one end of said bus, said units including at least a memory unit, a data processor unit and a controller unit, said system comprising:
  A. means, included in said controller unit, for indicating that a response had been requested from said memory unit when said controller unit was the highest priority unit;
  B. means, included in said controller unit and responsive to said means for indicating, for inhibiting any transfer of information between said controller unit and any other unit, until said memory units responds to said controller unit;
  C. means, included in each of said units, for enabling the transfer of information between any two units except a response requesting unit and a unit which is expected to respond, until said unit which is requested to respond, responds to said response requesting unit;
  D. means, included in said memory unit, for responding to the response requesting unit; and
  E. means, included in said controller unit, for disabling said means for inhibiting in response to a response from said memory unit.

14. A system as in claim 13 further comprising:
  A. means, included in said data processor unit, for indicating that a response had been requested from said memory unit when said processor unit was the highest priority requesting unit;
  B. means, included in said data processor unit and responsive to said means for indicating, for inhibiting any transfer of information by said data processor unit with any other unit, until said memory unit responds to said data processor unit; and
  C. means, included in said data processor unit, for disabling said means for inhibiting included in said data processor unit in response from said memory unit.

15. A system as in claim 14 further comprising:
  A. means, included in said data processor unit, for indicating the level of interruptability of said data processor unit; and
  B. means, included in said data processor unit, for disabling said means for inhibiting included in said data processor unit and enabling the transfer of information with said data processor unit at any time, if the interrupt level of the unit from which said information is to be transferred is more significant than said level of interruptability of said data processor unit.

16. A system as in claim 15 wherein said memory unit is coupled closest to said one end of said bus and wherein said data processor unit is coupled furthest away from said one end of said bus, whereby said memory unit is the highest priority unit and said data processor unit is the lowest priority unit.

* * * * *

UNITED STATES PATENT OFFICE
CERTIFICATE OF CORRECTION

PATENT NO. : 3,997,896
DATED : December 14, 1976
INVENTOR(S) : Frank V. Cassarino, Jr. et al It is certified that error appears in the above-identified patent and that said Letters Patent are hereby corrected as shown below:

IN THE CLAIMS

Claim 7, column 28, line 52, after "priority" insert --requesting--.

Claim 13, column 30, line 6, after "priority" insert --requesting--.

Claim 14, column 30, line 35, before "from" insert --to a response--.

Signed and Sealed this

Nineteenth Day of April 1977

[SEAL]

Attest:

RUTH C. MASON
Attesting Officer

C. MARSHALL DANN
Commissioner of Patents and Trademarks